(12) United States Patent
Kondou

(10) Patent No.: US 11,265,497 B2
(45) Date of Patent: Mar. 1, 2022

(54) SIGNAL PROCESSING APPARATUS AND METHOD, IMAGING ELEMENT, AND ELECTRONIC APPARATUS

(71) Applicant: SONY SEMICONDUCTOR SOLUTIONS CORPORATION, Kanagawa (JP)

(72) Inventor: Hiroyasu Kondou, Fukuoka (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 50 days.

(21) Appl. No.: 16/611,886

(22) PCT Filed: May 2, 2018

(86) PCT No.: PCT/JP2018/017489
§ 371 (c)(1),
(2) Date: Nov. 8, 2019

(87) PCT Pub. No.: WO2018/211986
PCT Pub. Date: Nov. 22, 2018

(65) Prior Publication Data
US 2021/0144328 A1    May 13, 2021

(30) Foreign Application Priority Data
May 17, 2017    (JP) .............................. JP2017-098134

(51) Int. Cl.
*H04N 5/374* (2011.01)
*H04N 5/357* (2011.01)
(Continued)

(52) U.S. Cl.
CPC ......... *H04N 5/3742* (2013.01); *H04N 5/3575* (2013.01); *H04N 5/378* (2013.01); *H04N 5/37455* (2013.01)

(58) Field of Classification Search
None
See application file for complete search history.

(56) References Cited

U.S. PATENT DOCUMENTS

2003/0030736 A1* 2/2003 Yoshihara ............ H04N 5/3765
348/243
2008/0231491 A1 9/2008 Muramatsu et al.
(Continued)

FOREIGN PATENT DOCUMENTS

| CN | 102629993 A | 8/2012 |
| CN | 103517003 A | 1/2014 |

(Continued)

OTHER PUBLICATIONS

International Search Report and Written Opinion of PCT Application No. PCT/JP2018/017489, dated Jun. 26, 2018, 10 pages of ISRWO.

*Primary Examiner* — Mark T Monk
(74) *Attorney, Agent, or Firm* — Chip Law Group

(57) ABSTRACT

The present disclosure relates to a signal processing apparatus and method, an imaging element, and an electronic apparatus capable of suppressing deterioration of subjective image quality. Driving of a shift register controlling transfer of pixel data of digital data obtained by A/D conversion is stopped in a part or the entirety of a period in which the A/D conversion is performed on a pixel output of an analog signal. The present disclosure can be applied to, for example, a signal processing apparatus, an imaging element, an imaging device, an image processing apparatus, an electronic apparatus, a signal processing method, a program, or the like.

20 Claims, 16 Drawing Sheets

(51) Int. Cl.
*H04N 5/3745* (2011.01)
*H04N 5/378* (2011.01)

(56) References Cited

U.S. PATENT DOCUMENTS

| | | |
|---|---|---|
| 2012/0199724 A1 | 8/2012 | Nomura et al. |
| 2013/0342744 A1 | 12/2013 | Naganokawa et al. |
| 2015/0156433 A1 | 6/2015 | Nomura et al. |

FOREIGN PATENT DOCUMENTS

| | | |
|---|---|---|
| EP | 2093883 A1 | 8/2009 |
| JP | 2012-095349 A | 5/2012 |
| JP | 2012-165168 A | 8/2012 |
| JP | 2014-007636 A | 1/2014 |

* cited by examiner

SIGNAL PROCESSING APPARATUS AND METHOD, IMAGING ELEMENT, AND ELECTRONIC APPARATUS

CROSS REFERENCE TO RELATED APPLICATIONS

This application is a U.S. National Phase of International Patent Application No. PCT/JP2018/017489 filed on May 2, 2018, which claims priority benefit of Japanese Patent Application No. JP 2017-098134 filed in the Japan Patent Office on May 17, 2017. Each of the above-referenced applications is hereby incorporated herein by reference in its entirety.

TECHNICAL FIELD

The present disclosure relates to a signal processing apparatus and method, an imaging element, and an electronic apparatus, and more particularly, to a signal processing apparatus and method, an imaging element, and an electronic apparatus capable of suppressing deterioration of subjective image quality.

BACKGROUND ART

Conventionally, in an imaging element such as a general complementary metal oxide semiconductor (CMOS) image sensor or the like, pixel signals of a certain row read out from each column of a pixel array are A/D-converted and latched as digital data, and are data-transferred, signal-processed, and output from the imaging element while pixel signals of the next row are A/D-converted (for example, see Patent Document 1).

CITATION LIST

Patent Document

Patent Document 1: Japanese Patent Application Laid-Open No. 2010-199920

SUMMARY OF THE INVENTION

Problems to be Solved by the Invention

However, when the data transfer is performed, a sense amplifier converting the transferred digital data from a current to a voltage is driven, and current fluctuation occurs in the sense amplifier. Due to magnetic induction caused by the current fluctuation of the sense amplifier, there has been a possibility that noise would be superimposed on a ramp wave or the pixel signal which is an input of the A/D conversion. Due to the superimposition of this noise, as a result, lateral band-like noise, shading noise or the like has been generated in a captured image obtained in this imaging element, such that there has been a possibility that subjective image quality of the captured image would be deteriorated.

The present disclosure has been made in view of such a situation, and an object of the present disclosure is to be capable of suppressing deterioration of subjective image quality.

Solutions to Problems

A signal processing apparatus according to an aspect of the present technology is a signal processing apparatus including: a control unit that stops driving of a shift register controlling transfer of pixel data of digital data obtained by A/D conversion in a part or the entirety of a period in which the A/D conversion is performed on a pixel output of an analog signal.

A signal processing method according to an aspect of the present technology is a signal processing method including: stopping driving of a shift register controlling transfer of pixel data of digital data obtained by A/D conversion in a part or the entirety of a period in which the A/D conversion is performed on a pixel output of an analog signal.

An imaging element according to another aspect of the present technology is an imaging element including: a pixel array that includes a plurality of pixels each having a configuration for photoelectrically converting incident light; an A/D conversion unit that performs A/D conversion on a pixel output of an analog signal obtained from the pixel array; a holding unit that holds pixel data of digital data obtained by performing the A/D conversion on the pixel output by the A/D conversion unit; a sense amplifier that converts the pixel data read out from the holding unit from a current to a voltage; a shift register that controls transfer of the pixel data by controlling driving of the holding unit and the sense amplifier; and a control unit that stops driving of the shift register in a part or the entirety of a period in which the A/D conversion is performed on the pixel output by the A/D conversion unit.

An electronic apparatus according to still another aspect of the present technology is an electronic apparatus including: an imaging unit that captures an image of a subject; and an image processing unit that performs image processing on image data obtained by image capturing by the imaging unit, in which the imaging unit includes: a pixel array that includes a plurality of pixels each having a configuration for photoelectrically converting incident light; an A/D conversion unit that performs A/D conversion on a pixel output of an analog signal obtained from the pixel array; a holding unit that holds pixel data of digital data obtained by performing the A/D conversion on the pixel output by the A/D conversion unit; a sense amplifier that converts the pixel data read out from the holding unit from a current to a voltage; a shift register that controls transfer of the pixel data by controlling driving of the holding unit and the sense amplifier; and a control unit that stops driving of the shift register in a part or the entirety of a period in which the A/D conversion is performed on the pixel output by the A/D conversion unit.

In an aspect of the present technology, the driving of the shift register controlling the transfer of the pixel data of the digital data obtained by the A/D conversion is stopped in a part or the entirety of the period in which the A/D conversion is performed on the pixel output of the analog signal.

In another aspect of the present technology, the incident light of each pixel of the pixel array is photoelectrically converted, the A/D conversion is performed on the pixel output of the analog signal obtained from the pixel array, the pixel data of the digital data obtained by performing the A/D conversion on the pixel output is held in the holding unit, the pixel data read out from the holding unit is converted from the current to the voltage, and the driving of the shift register controlling the transfer of such pixel data is stopped in a part or the entirety of the period in which the A/D conversion is performed on the pixel output.

In still another aspect of the present technology, in the imaging unit capturing the image of the subject, the incident light of each pixel of the pixel array is photoelectrically converted, the A/D conversion is performed on the pixel output of the analog signal obtained from the pixel array, the pixel data of the digital data obtained by performing the A/D conversion on the pixel output is held in the holding unit, the pixel data read out from the holding unit is converted from the current to the voltage, and the driving of the shift register controlling the transfer of such pixel data is stopped in a part or the entirety of the period in which the A/D conversion is performed on the pixel output, and in the outside of the imaging unit, image processing is performed on image data of the captured image of the subject obtained in the manner as described above.

Effects of the Invention

According to the present disclosure, it is possible to process a signal. In particular, it is possible to suppress deterioration of subjective image quality.

MODE FOR CARRYING OUT THE INVENTION

Hereinafter, modes for carrying out the present disclosure (hereinafter, referred to as embodiments) will be described. Note that a description will be given in the following order.
1. Influence of Magnetic Induction by Data Transfer
2. First Embodiment (Imaging Element and Data Transfer Control Based on Count)
3. Second Embodiment (Imaging Element and Data Transfer Control Based on Enable Signal)
4. Third Embodiment (Imaging Element and Data Transfer Control Based on Shift Register Reset)
5. Fourth Embodiment (Imaging Element and Data Transfer Control by Others)
6. Fifth Embodiment (Imaging Device)
7. Application Example to Moving Body
8. Others 1. Influence of Magnetic Induction by Data Transfer <Data Transfer and A/D Conversion>
Conventionally, in an imaging element such as a general complementary metal oxide semiconductor (CMOS) image sensor or the like, pixel signals read out row by row from a pixel array, A/D-converted row by row and latched as digital data, data-transferred row by row, signal-processed, and output from the imaging element.

Figure 1:
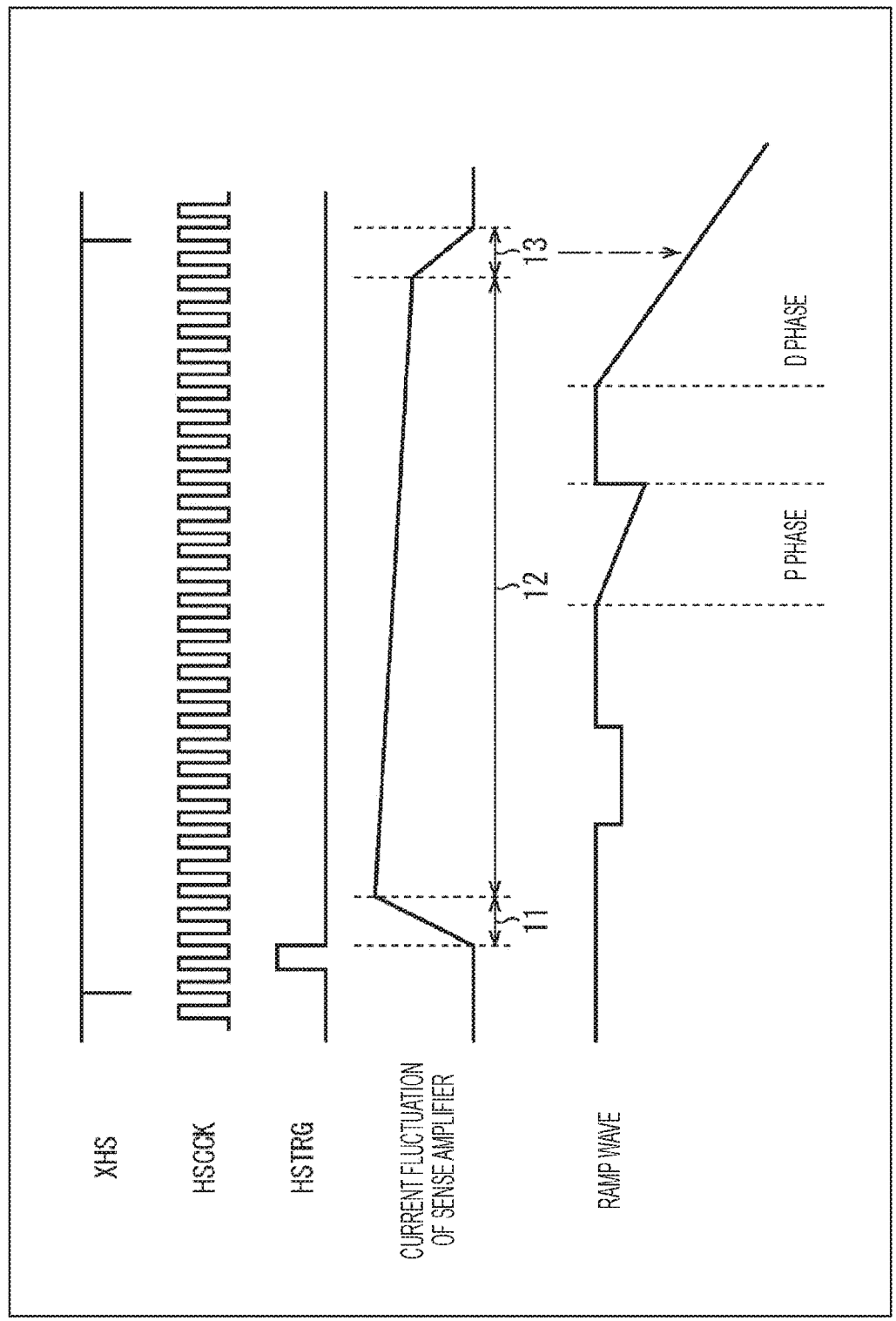
FIG. 1 is a view for describing an example of an aspect of current fluctuation of a sense amplifier.

For example, when a pulse (data transfer start pulse) is supplied as a data transfer start notification signal HSTRG as illustrated at a third stage from the top in a data readout period XHS set as illustrated at the top stage of FIG. 1, a shift register that controls data transfer of pixel signals sequentially supplies digital data held in data latches of each column to a sense amplifier according to a shift register clock HSCCK illustrated at a second stage from the top. In other words, the shift register supplies pixel signals of one row to the sense amplifier pixel by pixel. The sense amplifier converts currents of the pixel signals supplied for each pixel into voltages and supplies the voltages to the subsequent stage.

Due to such a data transfer operation, for example, in the sense amplifier, current fluctuation occurs as illustrated at a fourth stage from the top of FIG. 1. For example, in a period 11 immediately after the start of data transfer, the supply of a current to the sense amplifier is started, and a current that was substantially zero before the start of the data transfer significantly changes. Furthermore, in a period 12 during a transfer period, the current supplied to the sense amplifier gently changes depending on a distance between a data latch to be processed and a power supply, or the like. Moreover, in a period 13 in which the data transfer is completed, the current of the sense amplifier significantly changes until it becomes substantially zero.

In parallel with such data transfer, pixel signals of the next row are read out from the pixel array, and A/D conversion is performed on the pixel signals of the row. For example, an A/D conversion unit is provided for each column of the pixel array, and pixel signals of each pixel in the row are A/D-converted in parallel with each other. In this A/D conversion, magnitudes of the pixel signal read out from the pixel array and a ramp wave as illustrated at the bottom of FIG. 1 are compared with each other. A time (count value) from the start of the comparison until the ramp wave becomes larger than the pixel signal is output as digital data of the pixel signal. Note that correlated double sampling (CDS) is performed in the readout of the pixel signal. Therefore, as illustrated at the bottom of FIG. 1, the A/D conversion is performed twice in a reset period (P phase) and a signal readout period (D phase).

When the current fluctuation as described above occurs due to the data transfer in, for example, the sense amplifier or the like during the A/D conversion, noise has been superimposed on the pixel signal or the ramp wave due to magnetic induction caused by the current fluctuation, such that there has been a possibility that it would be impossible to correctly perform the A/D conversion. As such, when an error occurs in an A/D conversion result, as a result, lateral band-like noise, shading noise or the like has been generated in a captured image obtained in this imaging element, such that there has been a possibility that subjective image quality of the captured image would be deteriorated.

2. First Embodiment

<Data Transfer Control During A/D Conversion>

By the way, driving of the shift register controlling transfer of pixel data of digital data obtained by A/D conversion is stopped in a part or the entirety of a period in which the A/D conversion is performed on a pixel output of an analog signal.

In this way, it is possible to suppress the current fluctuation of the sense amplifier during the A/D conversion, and it is thus possible to suppress an influence of data transfer on the pixel output or the ramp wave. Therefore, it is possible to suppress the generation of the lateral band-like noise, the shading noise or the like in the captured image to suppress the deterioration of the subjective image quality of the captured image.

<Imaging Element>

Figure 2:
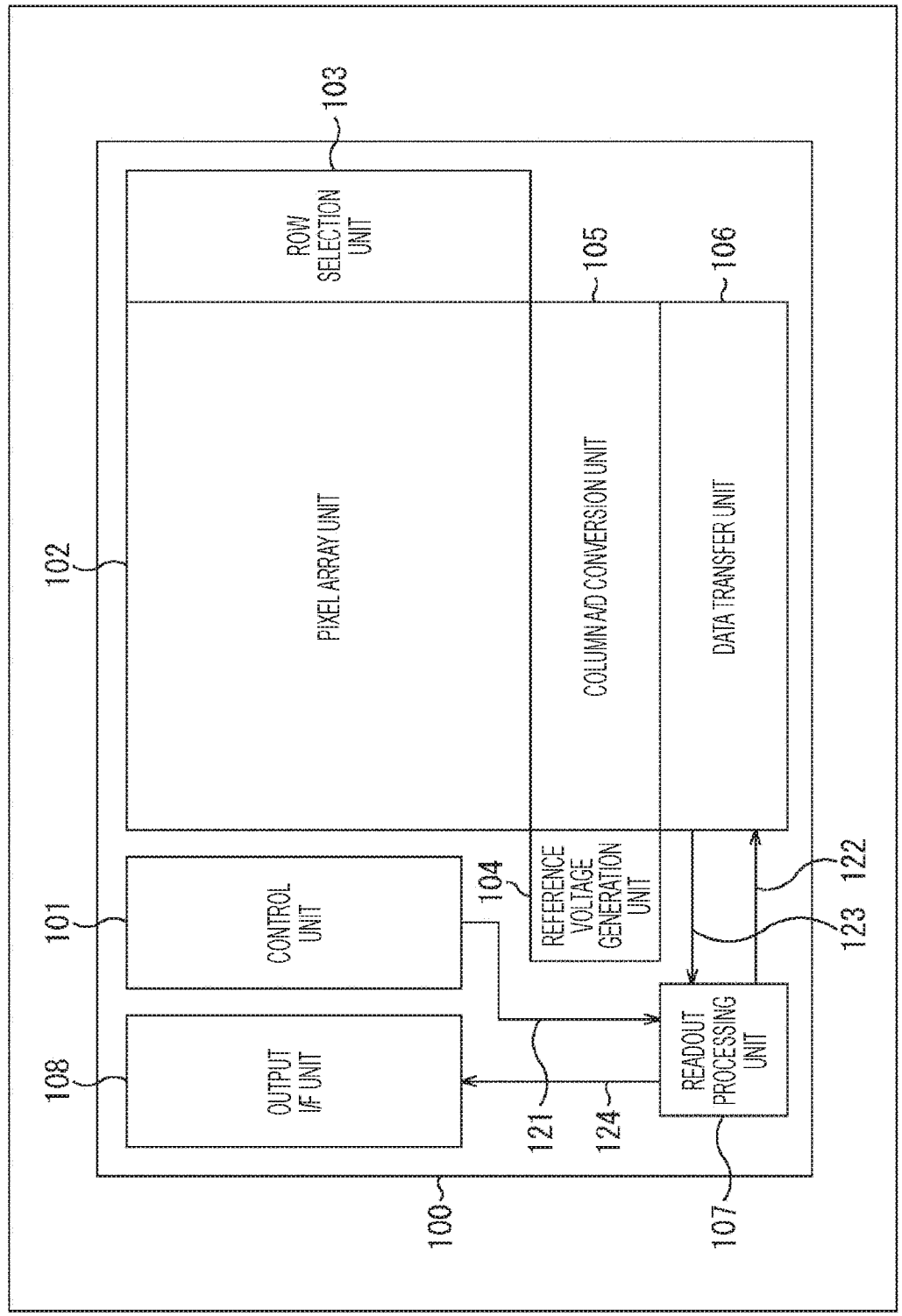
FIG. 2 is a block diagram illustrating a main configuration example of an imaging element.

FIG. 2 is a block diagram illustrating an example of an embodiment of an imaging element to which the present technology is applied. An imaging element 100 illustrated in FIG. 2 is a device that photoelectrically converts light from a subject and outputs the light as image data. For example, the imaging element 100 is configured as a complementary metal oxide semiconductor (CMOS) image sensor using a CMOS.

As illustrated in FIG. 2, the imaging element 100 includes a control unit 101, a pixel array unit 102, a row selection unit 103, a reference voltage generation unit 104, a column A/D conversion unit 105, a data transfer unit 106, a readout processing unit 107, and an output interface (I/F) unit 108.

The control unit 101 includes a predetermined digital circuit and the like, and performs processing related to control of driving of each processing unit in the imaging element 100. For example, the control unit 101 controls processing performed in each processing unit by supplying a clock signal, a control signal or the like to each processing unit.

Note that the control unit 101 includes, for example, a central processing unit (CPU), a read only memory (ROM), and a random access memory (RAM), and the CPU may perform these processings by loading a program or data stored in the ROM or the like into the RAM and executing the program or the data.

The pixel array unit 102 includes a plurality of pixels and the like each having a configuration (for example, a photodiode or the like) that receives incident light from a subject and photoelectrically converts the incident light and arranged in, for example, a matrix shape. The each pixel is controlled by, for example, the control unit 101, the row selection unit 103 or the like, such that the incident light is photoelectrically converted in the photodiode and electric charges of a quantity of electric charge corresponding to an amount of the incident light are accumulated in each pixel.

In the pixel array unit 102, an analog signal of a voltage (pixel value) corresponding to the quantity of electric charge accumulated in each pixel is read out as a pixel output from each pixel. The readout of the pixel output is controlled by, for example, the control unit 101, the row selection unit 103 or the like, and is performed for each line (row).

The row selection unit 103 has a configuration related to selection of a line (row), and performs processing related to the selection of the line. For example, the row selection unit 103 is controlled by the control unit 101, selects a line (row) of which a pixel output is read out from the pixel array unit 102, in other words, a line of which a pixel value is to be read out, and supplies a control signal indicating the selected line to the pixel array unit 102.

The reference voltage generation unit 104 has a configuration related to generation of a ramp wave, and performs processing related to generation of a reference voltage. For example, the reference voltage generation unit 104 is controlled by the control unit 101, generates a reference voltage of a predetermined voltage or a ramp wave, used in A/D conversion of the pixel output, and supplies the reference voltage to the column A/D conversion unit 105.

The column A/D conversion unit 105 has, for example, a configuration related to A/D conversion, such as a comparator, a buffer, a counter and the like, and performs processing related to the A/D conversion. For example, the column A/D conversion unit 105 has a configuration realizing an A/D conversion function for each column of the pixel array unit 102, is controlled by the control unit 101, and can perform A/D conversion on pixel outputs (analog signals) of each column read out from the pixel array unit 102 in parallel with each other. Therefore, in a case where the pixel outputs are read out line by line from the pixel array unit 102, the column A/D conversion unit 105 can perform A/D conversion on pixel outputs of each column (that is, each pixel) of one line in parallel with each other. That is, in this case, the column A/D conversion unit 105 performs A/D conversion on the pixel outputs line by line. For example, the column A/D conversion unit 105 compares the pixel outputs of each column of the line read out from the pixel array unit 102 with the reference voltage generated by the reference voltage generation unit 104, counts a time (clock number) from the start of the comparison until the reference voltage becomes larger than the pixel outputs, and sets the count value as an A/D conversion result. That is, the column A/D conversion unit 105 supplies the count value (digital data) of each column as pixel data to the data transfer unit 106.

Note that the imaging element 100 performs correlated double sampling (CDS) in the readout of the pixel output. That is, the imaging element 100 performs the readout twice in the reset period (P phase) and the signal readout period (D phase). Therefore, the column A/D conversion unit 105 also performs the A/D conversion twice in the reset period (P phase) and the signal readout period (D phase).

The data transfer unit 106 has, for example, a configuration related to transfer of pixel data, such as a data latch, a sense amplifier, a shift register, and the like, and performs processing related to data transfer of the pixel data. For example, the data transfer unit 106 is controlled by the control unit 101 and the readout processing unit 107, and sequentially transfers pixel data of one line supplied from the column A/D conversion unit 105 to the readout processing unit 107 column by column.

The readout processing unit 107 includes a predetermined digital circuit and the like, is controlled by the control unit 101, and performs processing related to readout of the pixel data from the data transfer unit 106. For example, the readout processing unit 107 acquires a clock signal, a control signal or the like from the control unit 101 as indicated by an arrow 121, and performs processing on the basis of those signals. Furthermore, for example, the readout processing unit 107 supplies a clock signal, a control signal or the like to the data transfer unit 106, as indicated by an arrow 122, and controls driving of the data transfer unit 106 (in other words, the data transfer of the pixel data). Moreover, for example, the readout processing unit 107 acquires the pixel data read out from the data transfer unit 106, as indicated by an arrow 123. Furthermore, for example, the readout processing unit 107 temporarily holds the acquired pixel data. Note that the readout processing unit 107 may perform predetermined signal processing on the pixel data. Moreover, for example, the readout processing unit 107 supplies the held data to the output interface (I/F) unit 108 as indicated by an arrow 124 at a predetermined timing or the like.

Note that, for example, the readout processing unit 107 includes a CPU, a ROM, a RAM, and the like, and the CPU may perform those processings by loading a program or data stored in the ROM or the like into the RAM and executing the program or the data.

The output interface (I/F) unit 108 is controlled by the control unit 101 and performs processing related to the output of the pixel data. For example, the output interface unit 108 includes a predetermined external output terminal, and outputs the pixel data or the like supplied from the readout processing unit 107 to the outside of the imaging element 100 through the external output terminal.

<Data Transfer Unit>

Figure 3:
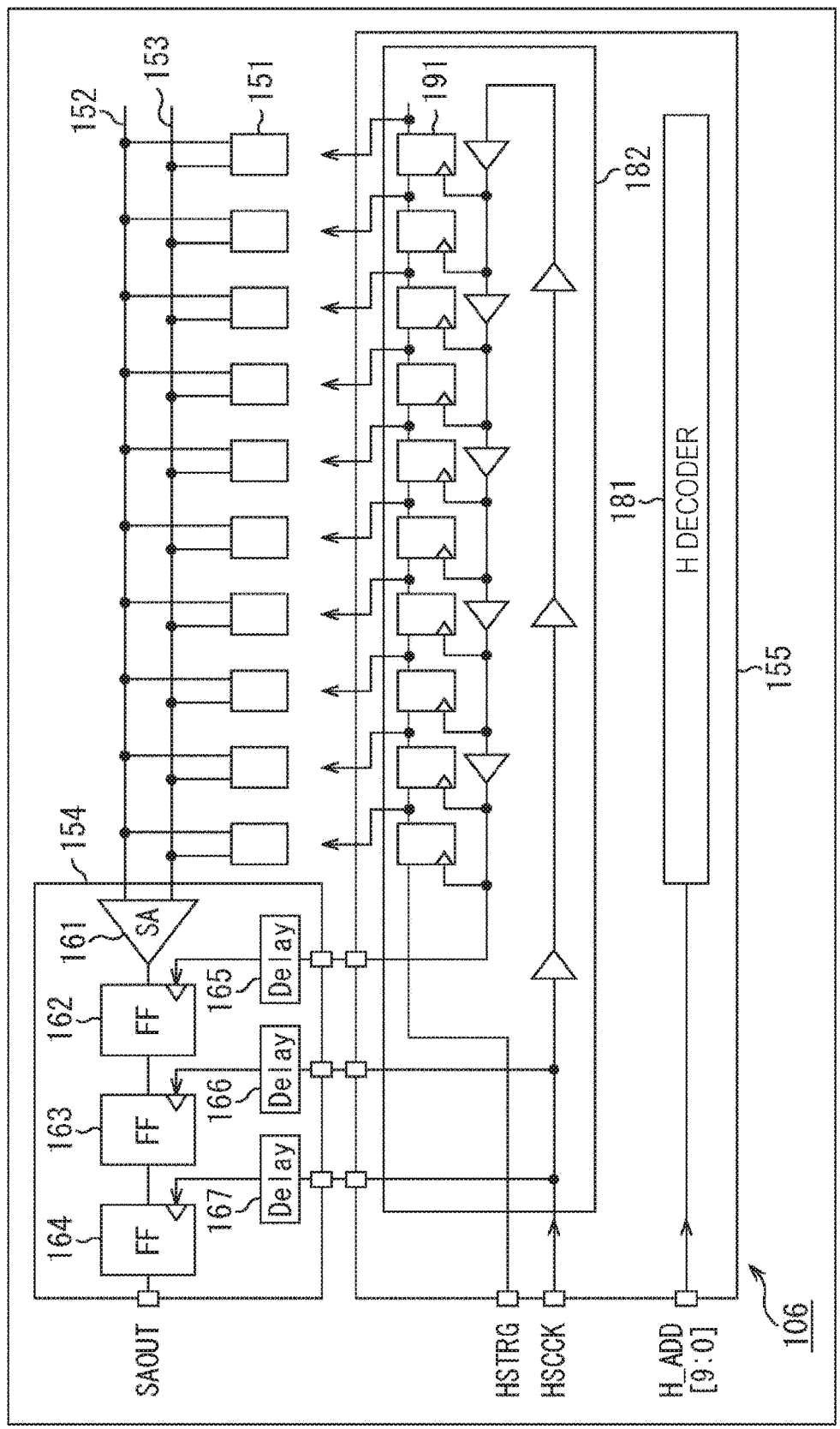
FIG. 3 is a block diagram illustrating a main configuration example of a data transfer unit.

FIG. 3 is a view illustrating a main configuration example of the data transfer unit 106. As illustrated in FIG. 3, the data transfer unit 106 includes data latches 151, a data bus 152, a data bus 153, a sense amplifier 154, and an H scanner 155.

The data latch 151 has a configuration capable of storing information, and holds the pixel data (A/D conversion result) supplied from the column A/D conversion unit 105. Note that, in FIG. 3, reference numeral 151 is given to only one quadrangle, but all the similar quadrangles arranged in a horizontal direction in FIG. 3 indicate the data latches 151. Furthermore, ten data latches 151 are illustrated in FIG. 3, but the data latches 151 are actually provided for each column of the pixel array unit 102.

That is, illustration of signal lines connecting the column A/D conversion unit 105 and the data latches 151 to each other is omitted in FIG. 3, but the pixel data of each column obtained in the column A/D conversion unit 105 is transmitted through the signal line assigned to each column, and is held by the data latch 151 assigned to each column.

Each data latch 151 is connected to (an amplification unit 161 of) the sense amplifier 154 by the data bus 152 and the data bus 153. The pixel data held in each data latch 151 are controlled by an H scanner 155 (shift register 182) as described later, and are sequentially supplied to (the amplification unit 161 of) the sense amplifier 154 column by column.

A positive current corresponding to a value held in data latch 151 flows to one of the data bus 152 and the data bus 153, and a negative current corresponding to the value held in data latch 151 flows to the other of the data bus 152 and the data bus 153. That is, the pixel data held in the data latch 151 is supplied as a current to the sense amplifier 154. The sense amplifier 154 converts the current of the supplied pixel data into a voltage, and supplies the voltage to the readout processing unit 107.

As illustrated in FIG. 3, the sense amplifier 154 includes, for example, the amplification unit (SA) 161, flip-flops 162 to 164, and delay units (Delay) 165 to 167. The amplification unit 161 differentially amplifies the current input through the data bus 152 and the data bus 153 and converts the current into a voltage. The flip-flops 162 to 164 are controlled by an H scanner 155 (shift register 182) as described later through the delay unit 165 to the delay unit 167, and transfer the output (pixel data) of the amplification unit 161 to the readout processing unit 107 at a predetermined timing (SAOUT).

The H scanner 155 has a configuration related to control of a data transfer operation of the pixel data as described above, is controlled by the readout processing unit 107, the control unit 101 or the like, and performs processing related to control of the data transfer operation. For example, the H scanner 155 includes an H decoder 181 and the shift register 182 as illustrated in FIG. 3. The H decoder 181 decodes supplied address information H_ADD, generates a control signal indicating an address (column) specified by the address information H_ADD, and supplies the control signal to the shift register 182.

The shift register 182 has, for example, a configuration related to the control of the data transfer operation of the pixel data, such as flip-flops 191, amplification units or the like, is controlled by the readout processing unit 107, the control unit 101, the H decoder 181, or the like, and performs the processing related to the control of the data transfer operation of the pixel data. Note that, in FIG. 3, reference numeral 191 is given to only one flip-flop, but all the similar flip-flops arranged in the horizontal direction in FIG. 3 are flip-flops 191 constituting the shift register 182. Furthermore, ten flip-flops 191 are illustrated in FIG. 3, but the flip-flops 191 are actually provided in the same number as the data latches 151 (in other words, are provided for each column of the pixel array unit 102).

The shift register 182 is driven on the basis of a control signal such as the data transfer start notification signal HSTRG supplied from the readout processing unit 107, the shift register clock HSCCK or the like, a control signal supplied from the H decoder 181, and the like. The shift register 182 is driven, such that driving of each data latch 151 and the sense amplifier 154 is controlled. More specifically, the shift register 182 controls the transfer of the pixel data held in each data latch 151 to the sense amplifier 154 by controlling the readout of the pixel data from each data latch 151. Furthermore, the shift register 182 controls the driving of the flip-flops 162 to 164 of the sense amplifier 154 through the delay unit 165 to the delay unit 167 to control the transfer of the output of the amplification unit 161 to the readout processing unit 107 (SAOUT).

<Data Transfer Control Method>

As described with reference to FIG. 1, when the current fluctuation occurs in the sense amplifier or the like during the A/D conversion, the noise is superimposed on the pixel output or the ramp wave due to the magnetic induction or the like caused by the current fluctuation. As a result, there is a possibility that the subjective image quality of the captured image will be deteriorated. Therefore, in order to suppress such noise, it is sufficient if the current fluctuation during the A/D conversion due to the data transfer is suppressed. Therefore, for example, the data transfer of the pixel data may be stopped during the A/D conversion to stop the driving of the sense amplifier. Therefore, for example, the driving of the shift register 182 may be stopped. The driving of the shift register 182 can be controlled, for example, by controlling the supply of the shift register clock HSCCK.

Figure 4:
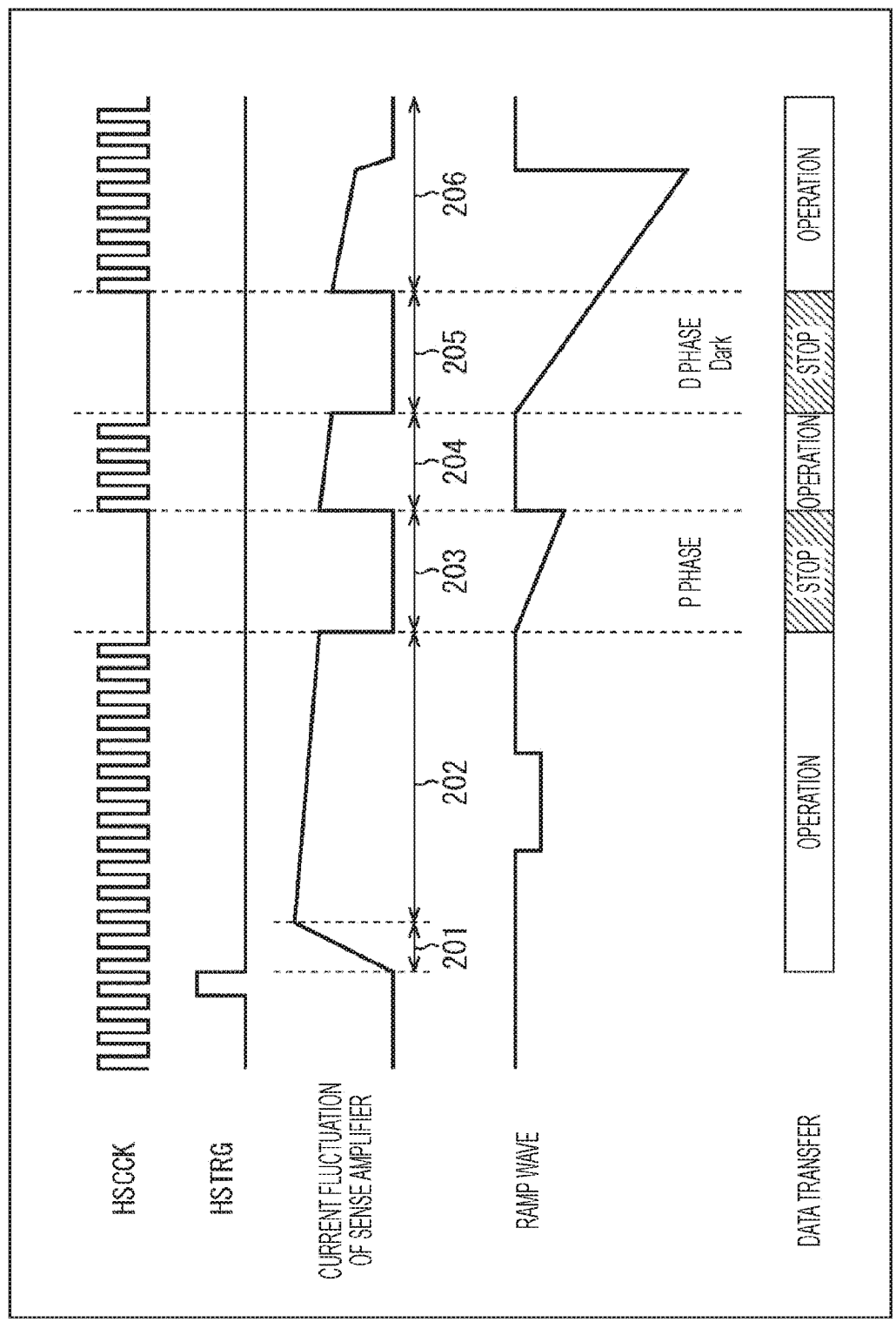
FIG. 4 is a view for describing an example of an aspect of data transfer control.

An example of the data transfer control is illustrated in FIG. 4. That is, first, a pulse (data transfer start pulse) is supplied as a data transfer start notification signal HSTRG to the shift register 182 as illustrated a second stage from the top of FIG. 4 to start the data transfer of the pixel data to the shift register 182. The shift register 182 sequentially supplies the digital data (pixel data) held in the data latch of each column to the sense amplifier 154 according to a shift register clock HSCCK for driving the shift register 182 at a first stage from the top.

Therefore, as illustrated at a third stage from the top, a current of the sense amplifier 154 significantly fluctuates, similar to a case of FIG. 1, in a period 201 immediately after the start, and gently changes, similar to the case of FIG. 1, in a period 202 during the data transfer. That is, in these periods, the A/D conversion is not performed, and the data transfer is thus executed, similar to FIG. 1.

Then, as illustrated at the first stage from the top, in a period 203 in which A/D conversion of a reset period (P phase) is performed, the supply of the shift register clock HSCCK is stopped. That is, a pulse of the shift register clock HSCCK is not supplied to the shift register 182. Thus, the driving of the shift register 182 can be stopped. That is, the data transfer is stopped. Therefore, the driving of the sense amplifier 154 is also stopped, and the current of the sense amplifier 154 thus becomes substantially zero as illustrated at the third stage from the top.

When the period 203 in which the A/D conversion of the reset period (P phase) is performed ends, the supply of the shift register clock HSCCK is restarted as illustrated at the first stage from the top. Thus, the driving of the shift register 182 can be restarted. That is, the data transfer is restarted, such that the driving of the sense amplifier 154 is also restarted, and the current of the sense amplifier 154 significantly changes from a state of a substantially zero to a value at the time of driving, as illustrated at the third stage from the top. Then, in a period 204, the data transfer is performed, and the current of the sense amplifier gently changes, similar to the case of FIG. 1. That is, in this period 204, the A/D conversion is not performed, and the data transfer is thus executed, similar to FIG. 1.

Then, as illustrated at the first stage from the top, when a period 205 in which A/D conversion of a signal readout period (D phase Dark) is performed starts, the supply of the shift register clock HSCCK is again stopped. Thus, similar to a case of the period 203, the driving of the shift register 182 is stopped, such that the data transfer and the driving of the sense amplifier 154 are also stopped. Therefore, as illustrated at the third stage from the top, the current of the sense amplifier 154 becomes substantially zero.

Note that, when a predetermined timing within the signal readout period starts (when the period 205 ends), the supply of the shift register clock HSCCK is restarted as illustrated at the first stage from the top. Thus, the driving of the shift register 182 is restarted, such that the data transfer and the driving of the sense amplifier 154 are restarted. Therefore, as illustrated at the third stage from the top, the current of the sense amplifier 154 significantly changes from a state of a substantially zero to a value at the time of driving. Then, until the data transfer ends in the subsequent period 206, the current of the sense amplifier 154 gently changes, similar to the case of FIG. 1. Then, when the data transfer ends, the driving of the sense amplifier 154 is also stopped, and the current of the sense amplifier 154 thus changes gently until it becomes substantially zero.

As described above, by stopping the driving of the shift register 182 during the A/D conversion, it is possible to suppress the current fluctuation due to the data transfer during the A/D conversion. That is, by stopping the driving of the shift register 182 during the A/D conversion, it is possible to suppress the noise from being superimposed on the pixel output or the ramp wave. As a result, it is possible to suppress the generation of the lateral band-like noise, the shading noise or the like in the captured image to suppress the deterioration of the subjective image quality of the captured image.

Then, as described above, the driving of the shift register 182 can be easily controlled by the supply of the shift register clock HSCCK from the readout processing unit 107.

That is, for example, the readout processing unit 107 can stop the driving of the shift register 182 by stopping the supply of the shift register clock HSCCK. Furthermore, the readout processing unit 107 can restart the driving of the shift register 182 by restarting the supply of the shift register clock HSCCK.

Therefore, the readout processing unit 107 can easily stop the driving of the shift register 182 at a desired timing. That is, the readout processing unit 107 can easily perform control to stop the driving of the shift register 182, for example, in a period in which the A/D conversion is performed. That is, the readout processing unit 107 can easily suppress the current fluctuation of the sense amplifier or the like during the A/D conversion.

Note that, as described above, when the data transfer is interrupted, processing time of the data transfer naturally increases as much. However, the data transfer of the pixel data and A/D conversion of a pixel output of the next line should end within a predetermined data readout period (XHS). In other words, when these processings are delayed, the data readout period becomes longer as much, such that a frame rate is decreased. Therefore, if this increase in the processing time exceeds an allowable range, there is a possibility that the processing will fail.

Therefore, it is preferable to perform the data transfer control described above so that the data transfer of the pixel data and the A/D conversion of the pixel output of the next line end within the predetermined data readout period (XHS). That is, the stop of the driving of the shift register 182 is required to be performed at an appropriate length. As described above, the readout processing unit 107 can easily control not only the stop of the driving of the shift register 182, but also the restart of the driving of the shift register 182 by controlling the supply of the shift register clock HSCCK. That is, the readout processing unit 107 can easily stop the driving of the shift register 182 at a desired period. That is, the readout processing unit 107 can easily suppress the current fluctuation of the sense amplifier or the like during the A/D conversion while preventing the processing from failing.

Note that a period in which the current fluctuation of the sense amplifier 154 as described above is suppressed (for example, a period during which the driving of shift register 182 is stopped) may be the entirety or a part of a period in which the A/D conversion is performed. By suppressing the current fluctuation of the sense amplifier 154 in at least a part of the period in which the A/D conversion is performed, it is possible to suppress an influence of the magnetic induction caused by the current fluctuation of the sense amplifier 154 or the like on the pixel output or the ramp wave in at least the period in which the A/D conversion is performed.

However, generally, the lateral band-like noise, the shading noise or the like in the captured image is likely to be more visually conspicuous in a dark image (image having a small pixel value) than in a bright image (image having a large pixel value). That is, in the captured image, the subjective image quality is likely to be more deteriorated in a case where the lateral band-like noise, the shading noise or the like is generated in a relatively dark region (region having a relatively small pixel value) than in a case where that the lateral band-like noise, the shading noise or the like is generated in a relatively bright region (region having a relatively large pixel value).

Therefore, in a case where the A/D conversion is performed as described above, in the period in which the A/D conversion is performed, an influence of the current fluctuation of the sense amplifier 154 on the subjective image quality of the captured image generally becomes the largest at the time of start of the period, becomes small with the passage of time, and becomes the smallest at the time of end of the period.

Therefore, the driving of the shift register 182 may be stopped from a start timing of the period in which the A/D conversion is performed. In this way, it is possible to suppress the deterioration of the subjective image quality as compared to a case of stopping the driving of the shift register 182 from other timings. For example, the readout processing unit 107 may stop the supply of the shift register clock HSCCK at the start timing of the period in which the A/D conversion is performed. In this way, it is possible to suppress the deterioration of the subjective image quality as compared with a case of stopping the supply of the shift register clock HSCCK at other timings.

In addition, for example, in a case of stopping the driving of the shift register 182 in a part of the period in which the A/D conversion is performed, by setting a period in which the driving of the shift register 182 is stopped before the period in which the A/D conversion is performed, that is, to be close to the start timing of the period in which the A/D conversion is performed, it is possible to suppress the deterioration of the subjective image quality.

In other words, as a timing becomes close to an end of the period in which the A/D conversion is performed, an influence on the subjective image quality of the captured image becomes relatively small. That is, for example, in order to end the data transfer of the pixel data and the A/D conversion of the pixel output of the next line within a predetermined data readout period (XHS), in a case where it is necessary to drive the shift register 182 in a part of the period in which the A/D conversion is performed, a period in which the shift register 182 is driven may be set after the period in which the A/D conversion is performed, that is, to be close to an end timing of the period in which the A/D conversion is performed. In this way, it is possible to further suppress the deterioration of the subjective image quality.

Note that it has been described hereinabove that the column A/D conversion unit 105 performs the A/D conversion on the pixel output in the reset period and the A/D conversion on the pixel output in the signal readout period so as to correspond to the readout of the correlated double sampling. In this case, as described above, the driving of the shift register 182 may be stopped in both of the period in which the A/D conversion is performed on the pixel output in the reset period and the period in which the A/D conversion is performed on the pixel output in the signal readout period. In this way, it is possible to suppress the deterioration of the subjective image quality as compared to a case of stopping the driving of the shift register 182 only in any one of the periods described above. For example, the readout processing unit 107 may stop the supply of the shift register clock HSCCK in both of the period in which the A/D conversion is performed on the pixel output in the reset period and the period in which the A/D conversion is performed on the pixel output in the signal readout period. In this way, it is possible to suppress the deterioration of the subjective image quality as compared with a case of stopping the supply of the shift register clock HSCCK only in any one of the periods described above.

Of course, also in this case, the driving of the shift register 182 may be stopped only in a part of each of the period in which the A/D conversion is performed on the pixel output in the reset period and the period in which the A/D conversion is performed on the pixel output in the signal readout period.

Then, in that case, for a reason similar to that as described above, by setting the period in which the driving of the shift register 182 is stopped before the periods in which each A/D conversion is performed, it is possible to further suppress the deterioration of the subjective image quality. For example, the driving of the shift register 182 may be stopped from start timings of the periods in which each A/D conversion is performed.

Furthermore, in a case of such correlated double sampling, the current fluctuation of the sense amplifier 154 in the period in which the A/D conversion is performed on the pixel output in the reset period has a larger influence on the subjective image quality of the captured image than the current fluctuation of the sense amplifier 154 in the period in which the A/D conversion is performed on the pixel output in the signal readout period has.

Therefore, the driving of the shift register 182 may be stopped preferentially in the period in which the A/D conversion is performed on the pixel output in the reset period. For example, the driving of the shift register 182 may be stopped in the entirety of the period in which the A/D conversion is performed on the pixel output in the reset period and a part of the period in which the A/D conversion is performed on the pixel output in the signal readout period. In this way, even though a total time in which the driving of shift register 182 is stopped is the same, it is possible to further suppress the deterioration of the subjective image quality of the captured image as compared with a case of driving the shift register 182 in a part of the period in which the A/D conversion is performed on the pixel output in the reset period.

However, in that case, for example, when the period in which the driving of the shift register 182 is stopped in the period in which the A/D conversion is performed on the pixel output in the signal readout period becomes extremely short (for example, when the period in which the driving of the shift register 182 is stopped becomes shorter than the period in which the A/D conversion is performed on the pixel output in the reset period), on the contrary, it is likely that an influence of the current fluctuation of the sense amplifier 154 in the period in which the A/D conversion is performed on the pixel output in the signal readout period, on the subjective image quality of the captured image, will become large.

Generally, the period in which the A/D conversion period is performed on the pixel output in the signal readout period is longer than the period in which the A/D conversion is performed on the pixel output in the reset period. Therefore, for example, the driving of the shift register may be stopped in the entirety of the period in which the A/D conversion is performed on the pixel output in the reset period and a period longer than the period in which the A/D conversion is performed on the pixel output in the reset period within the period in which the A/D conversion is performed on the pixel output in the signal readout period. In this way, it is possible to suppress the deterioration of the subjective image quality of the captured image while suppressing an increase in the influence of the current fluctuation of the sense amplifier 154 in the period in which the A/D conversion is performed on the pixel output in the signal readout period, on the subjective image quality of the captured image.

\<Control Based on Count Value\>

In order to control the supply of the shift register clock HSCCK as described above, the readout processing unit 107 may count a predetermined reference clock and stop and restart the supply of the shift register clock HSCCK on the basis of the count value.

\<Readout Processing Unit\>

Figure 5:
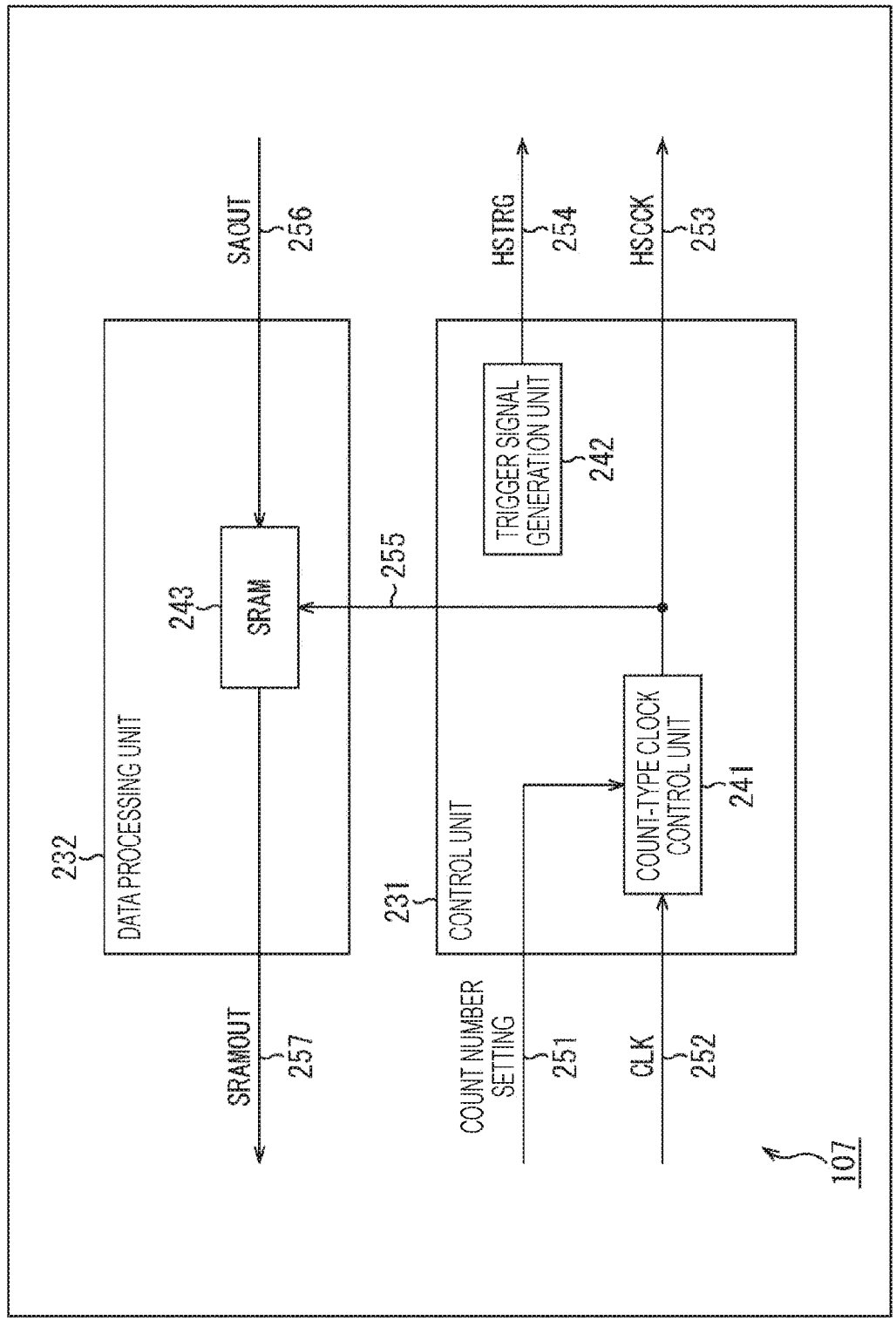
FIG. 5 is a block diagram illustrating a main configuration example of a readout processing unit.

A main configuration example of the readout processing unit 107 in a case of controlling the supply of the clock as described above is illustrated in FIG. 5. As illustrated in FIG. 5, the readout processing unit 107 includes a control unit 231 and a data processing unit 232.

The control unit 231 includes a predetermined digital circuit and the like, and performs processing related to control of the data transfer start notification signal HSTRG, the shift register clock HSCCK, or the like. For example, the control unit 231 controls the supply of these signals to the data transfer unit 106, the data processing unit 232, or the like. The control unit 231 includes, for example, a count-type clock control unit 241 and a trigger signal generation unit 242.

The count-type clock control unit 241 includes a predetermined digital circuit and the like, and controls the supply of the shift register clock HSCCK. The count-type clock control unit 241 counts an input clock, and controls the supply of the shift register clock HSCCK or the like on the basis of the count value.

For example, a count number setting, which is a setting of a count value for stopping or starting the supply of the shift register clock HSCCK, is supplied to the count-type clock control unit 241, as indicated by an arrow 251. This count number setting is supplied from, for example, the control unit 101. Of course, a supply source of this count number setting is optional, and, for example, this count number setting may be supplied from the outside of the imaging element 100. The count-type clock control unit 241 acquires and sets the count number setting.

Furthermore, a reference clock CLK is supplied from the control unit 101 to the count-type clock control unit 241, as indicated by an arrow 252. This reference clock is a general-purpose clock and can be a reference for optional processing. Note that a supply source of this reference clock CLK is optional, and, for example, this reference clock may be supplied from the outside of the imaging element 100. The count-type clock control unit 241 counts (pulses of) the reference clock CLK, and controls the supply of the shift register clock HSCCK on the basis of the count value and the set count number setting.

The count-type clock control unit 241 supplies the shift register clock HSCCK to the data transfer unit 106 (shift register 182) as indicated by an arrow 253. Furthermore, the count-type clock control unit 241 also supplies the shift register clock HSCCK to the data processing unit 232 (static random access memory (SRAM) 243) as indicated by the arrow 255.

The trigger signal generation unit 242 includes a predetermined digital circuit or the like, generates a data transfer start notification signal HSTRG, which is a trigger signal for the start of the data transfer, and supplies the data transfer start notification signal HSTRG to the data transfer unit 106 (shift register 182) as indicated by an arrow 254.

Note that, for example, the control unit 231 includes a CPU, a ROM, a RAM, and the like, and the CPU may perform these processings (realize a function of the count-type clock control unit 241 or the trigger signal generation unit 242) by loading a program or data stored in the ROM or the like into the RAM and executing the program or the data.

The data processing unit 232 includes a predetermined digital circuit and the like, and performs processing related to the pixel data transferred from the data transfer unit 106. For example, the pixel data transferred from the data transfer unit 106 is supplied to the data processing unit 232 (SAOUT), as indicated by an arrow 256. The data processing unit 232 performs predetermined processing on the pixel data, and supplies the pixel data after being processed to the output interface unit 108 as indicated by an arrow 257 (SRAMOUT). Note that this predetermined processing is optional.

For example, the data processing unit 232 includes the static random access memory (SRAM) 243. The SRAM 243 stores the pixel data transferred from the data transfer unit 106, reads out the pixel data at a predetermined timing, and supplies the pixel data to the output interface unit 108. The SRAM 243 performs such processing on the basis of the shift register clock HSCCK supplied from the control unit 231 (count-type clock control unit 241).

Note that, for example, the data processing unit 232 includes a CPU, a ROM, a RAM, and the like, and the CPU may perform these processings (realize a function of the SRAM 243) by loading a program or data stored in the ROM or the like into the RAM and executing the program or the data.

That is, in a case of the example of FIG. 5, (the count-type clock control unit 241 of) the control unit 231 of the readout processing unit 107 counts the predetermined reference clock CLK and stops and restarts the supply of the shift register clock HSCCK on the basis of the count value.

Figure 6:
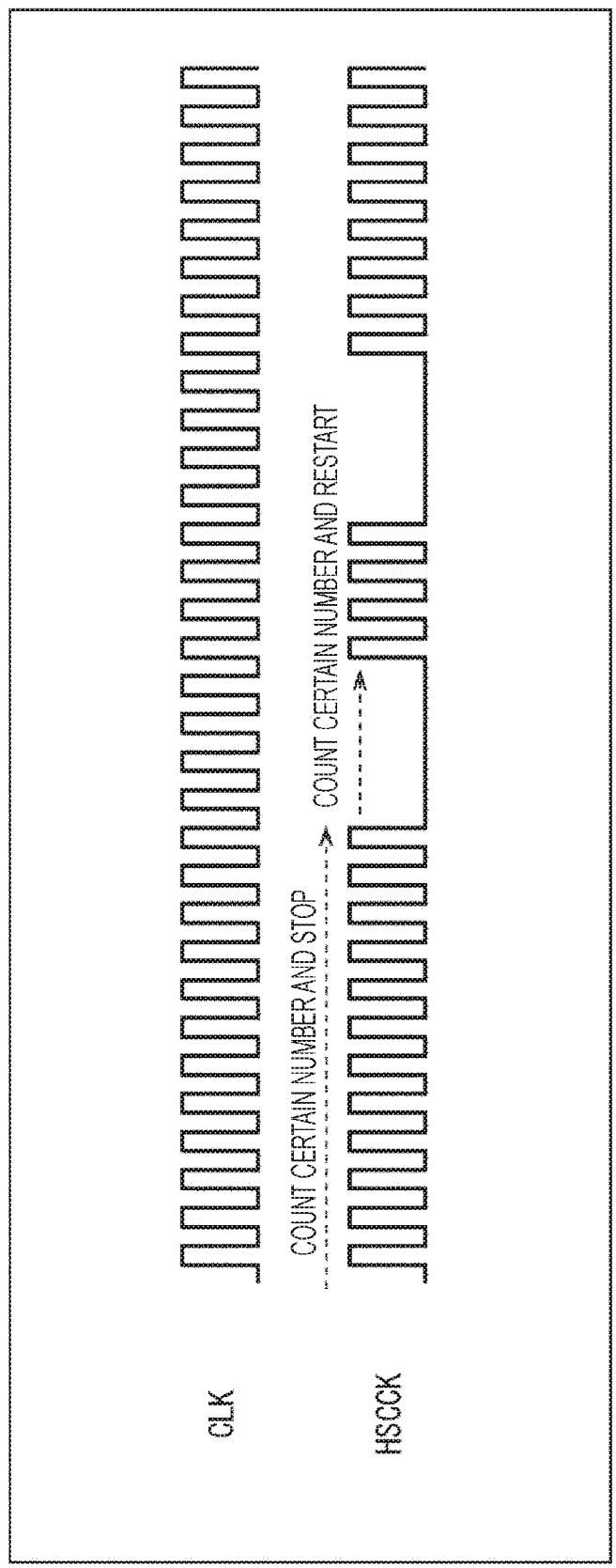
FIG. 6 is a view for describing an example of an aspect of clock control.

An example of an aspect of the clock control is illustrated in FIG. 6. For example, at a predetermined timing, the count-type clock control unit 241 starts the supply of the shift register clock HSCCK in synchronization with the reference clock CLK. Furthermore, the count-type clock control unit 241 starts a count of the reference clock CLK. Then, in a case where the count value reaches a value of the supply stop of the shift register clock HSCCK in the count number setting, the supply of the shift register clock HSCCK is stopped.

The count-type clock control unit 241 even thereafter continues the count of the reference clock CLK. Then, in a case where the count value reaches a value of the supply restart of the shift register clock HSCCK in the count number setting, the supply of the shift register clock HSCCK is restarted.

The count-type clock control unit 241 even thereafter continues the count of the reference clock CLK. Then, in a case where the count value reaches a value of the supply end of the shift register clock HSCCK in the count number setting, the supply of the shift register clock HSCCK ends. Note that when the data readout period ends, the count value is reset.

As described above, the count-type clock control unit 241 controls the supply of the shift register clock HSCCK on the basis of the count value of the reference clock CLK.

Such a value of the supply stop or restart of the shift register clock HSCCK is predetermined in the count number setting. Furthermore, these values are optional, but are set depending on a desired control timing. For example, in a case of stopping the driving of shift register 182 in the period in which the A/D conversion is performed as described above, these values are set in the count number setting so that the supply of the shift register clock HSCCK is stopped according to the period in which the A/D conversion is performed.

For example, in a case where it is desired to stop the supply of the shift register clock HSCCK plural times as in the case of the correlated double sampling described above, it is sufficient if a plurality of values of the supply stop or restart of the shift register clock HSCCK is set in the count number setting.

In other words, in a case where the plurality of values of the supply stop or restart of the shift register clock HSCCK is set in the count number setting, the count-type clock control unit 241 stops or restarts the supply of the shift register clock HSCCK on the basis of the respective values.

As described above, by controlling the supply of the shift register clock HSCCK on the basis of the count value of the reference clock CLK, it is possible to easily control the driving of the shift register 182. That is, it is possible to easily suppress the deterioration of the subjective image quality.

<Flow of Data Transfer Control Processing>

Figure 7:
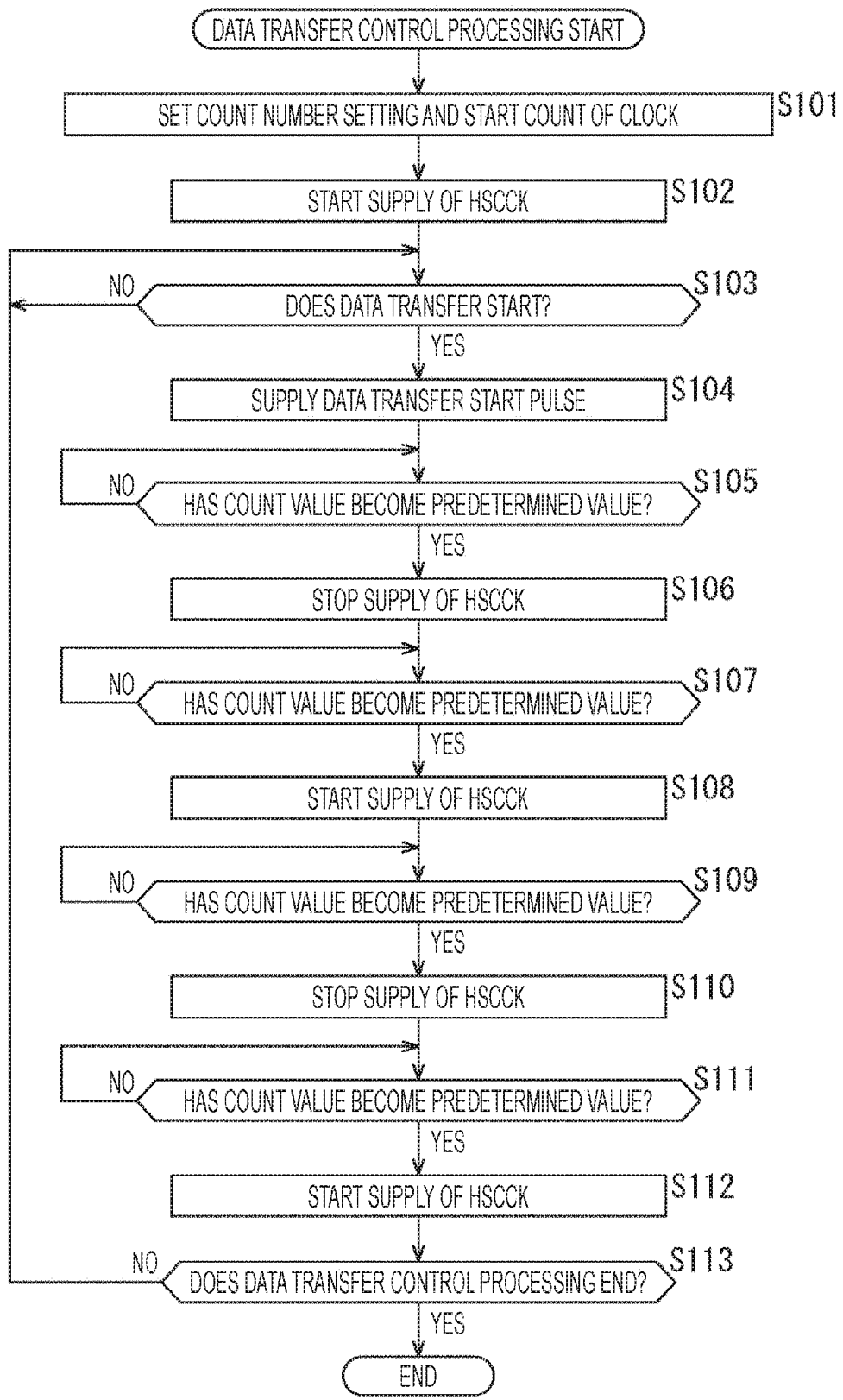
FIG. 7 is a flowchart for describing an example of a flow of data transfer control processing.

An example of a flow of data transfer control processing executed by the readout processing unit 107 will be described with reference to a flowchart of FIG. 7. Note that, here, a case where correlated double sampling is performed in readout of a pixel output as described with reference to FIG. 4 will be described by way of example. The readout processing unit 107 realizes the data transfer control as described above, for example, by executing processing of each step of this data transfer control processing in data transfer of each line.

When the data transfer control processing starts, the count-type clock control unit 241 sets the count number setting and starts the count of the reference clock CLK in step S101. Of course, the count value is initialized before starting the count. Then, this count is continued until this data transfer control processing ends.

In step S102, the count-type clock control unit 241 starts the supply of the shift register clock HSCCK in synchronization with the reference clock CLK.

In step S103, the trigger signal generation unit 242 determines whether or not to start the data transfer, and repeats this processing until it is determined that it is a timing to start the data transfer. Then, in a case where it is determined that it is a timing to start the data transfer, the processing proceeds to step S104.

In step S104, the trigger signal generation unit 242 supplies a pulse (data transfer start pulse) to the data transfer unit 106 (shift register 182) as the data transfer start notification signal HSTRG.

In step S105, the count-type clock control unit 241 determines whether or not the count value of the reference clock CLK has become a predetermined value set as a value for stopping the supply of the shift register clock HSCCK in the count number setting. The processing of step S105 is repeated until it is determined that the count value has reached the predetermined value. That is, during this period, the supply of the shift register clock HSCCK is continued.

Then, when it is determined that the count value has reached the predetermined value, the processing proceeds to step S106. In step S106, the count-type clock control unit 241 stops the supply of the shift register clock HSCCK. For example, the count-type clock control unit 241 stops the supply of the shift register clock HSCCK at the start timing of the period in which the A/D conversion is performed on the pixel output in the reset period on the basis of this predetermined value.

In step S107, the count-type clock control unit 241 determines whether or not the count value of the reference clock CLK has become a predetermined value set as a value for restarting the supply of the shift register clock HSCCK in the count number setting. The processing of step S107 is repeated until it is determined that the count value has reached the predetermined value. That is, during this period, the supply of the shift register clock HSCCK is stopped.

Then, when it is determined that the count value has reached the predetermined value, the processing proceeds to step S108. In step S108, the count-type clock control unit 241 restarts the supply of the shift register clock HSCCK. For example, the count-type clock control unit 241 restarts the supply of the shift register clock HSCCK at the end timing of the period in which the A/D conversion is performed on the pixel output in the reset period on the basis of this predetermined value.

In step S109, the count-type clock control unit 241 determines whether or not the count value of the reference clock CLK has become a predetermined value set as a value for stopping the supply of the shift register clock HSCCK in the count number setting. The processing of step S109 is repeated until it is determined that the count value has reached the predetermined value. That is, during this period, the supply of the shift register clock HSCCK is continued.

Then, when it is determined that the count value has reached the predetermined value, the processing proceeds to step S110. In step S110, the count-type clock control unit 241 stops the supply of the shift register clock HSCCK. For example, the count-type clock control unit 241 stops the supply of the shift register clock HSCCK at the start timing of the period in which the A/D conversion is performed on the pixel output in the signal readout period on the basis of this predetermined value.

In step S111, the count-type clock control unit 241 determines whether or not the count value of the reference clock CLK has become a predetermined value set as a value for restarting the supply of the shift register clock HSCCK in the count number setting. The processing of step S111 is repeated until it is determined that the count value has reached the predetermined value. That is, during this period, the supply of the shift register clock HSCCK is stopped.

Then, when it is determined that the count value has reached the predetermined value, the processing proceeds to step S112. In step S112, the count-type clock control unit 241 restarts the supply of the shift register clock HSCCK. For example, the count-type clock control unit 241 restarts the supply of the shift register clock HSCCK at a predetermined timing within the period in which the A/D conversion is performed on the pixel output in the signal readout period on the basis of this predetermined value.

In step S113, the count-type clock control unit 241 determines whether or not to end the data transfer control processing. In a case where it is determined that the count value of the reference clock CLK has not reached a predetermined value set as a value for ending the supply of the shift register clock HSCCK in the count number setting, the processing of step S113 is repeated until it is determined that the count value has reached the predetermined value. That is, during this period, the supply of the shift register clock HSCCK is continued.

Then, when it is determined that the count value has reached the predetermined value, the data transfer control processing ends. That is, the supply of the shift register clock HSCCK ends.

In this way, the readout processing unit 107 can control the supply of the shift register clock so as to suppress the current fluctuation of the sense amplifier 154 in the period in which the A/D conversion is performed. Therefore, it is possible to easily suppress the deterioration of the subjective image quality of the captured image.

3. Second Embodiment

<Control Based on Enable Signal>

Furthermore, the readout processing unit 107 may stop and restart the supply of the shift register clock HSCCK on the basis of a predetermined enable signal.

<Readout Processing Unit>

Figure 8:
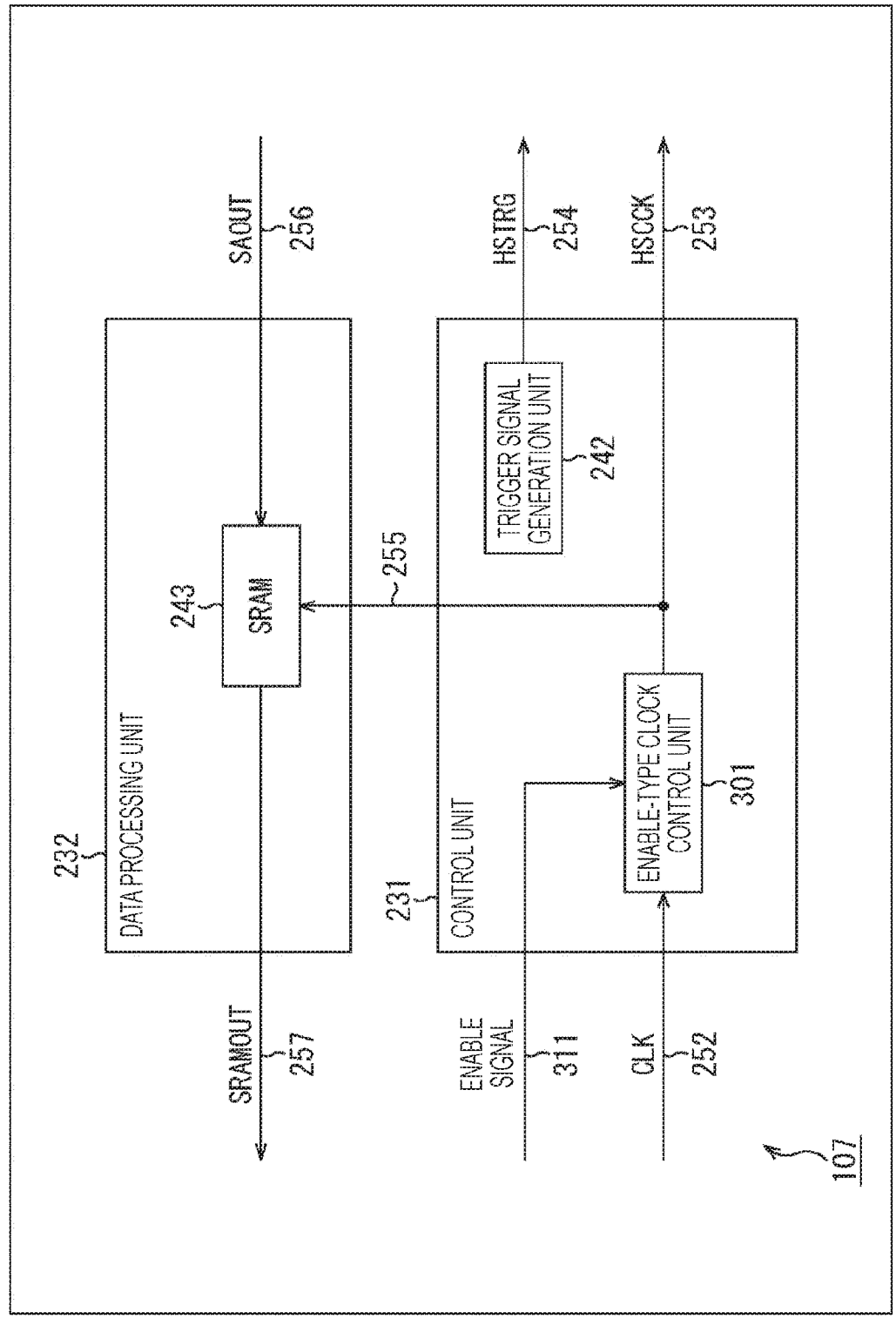
FIG. 8 is a block diagram illustrating a main configuration example of a readout processing unit.

A main configuration example of a readout processing unit 107 in this case is illustrated in FIG. 8. As illustrated in FIG. 8, the readout processing unit 107 in this case basically has a configuration similar to that of a case of FIG. 5. However, a control unit 231 includes an enable-type clock control unit 301 instead of the count-type clock control unit 241 of FIG. 5.

The enable-type clock control unit 301 includes a predetermined digital circuit and the like, and controls the supply of the shift register clock HSCCK on the basis of a supplied enable signal.

For example, an enable signal for controlling (permitting or prohibiting) the supply of the shift register clock HSCCK is supplied to the enable-type clock control unit 301, as indicated by an arrow 311. This enable signal is supplied from, for example, the control unit 101. Of course, a supply source of this enable signal is optional, and, for example, this enable signal may be supplied from the outside of the imaging element 100. The enable-type clock control unit 301 acquires the enable signal.

Furthermore, the reference clock CLK is supplied from the control unit 101 to the enable-type clock control unit 301 (arrow 252), similar to the case of FIG. 5. The enable-type clock control unit 301 controls the supply of the shift register clock HSCCK on the basis of the reference clock CLK and the enable signal.

Note that, also in this case, the control unit 231 includes a CPU, a ROM, a RAM, and the like, and the CPU may perform these processings (realize a function of the enable-type clock control unit 301 or the trigger signal generation unit 242) by loading a program or data stored in the ROM or the like into the RAM and executing the program or the data.

Figure 9:
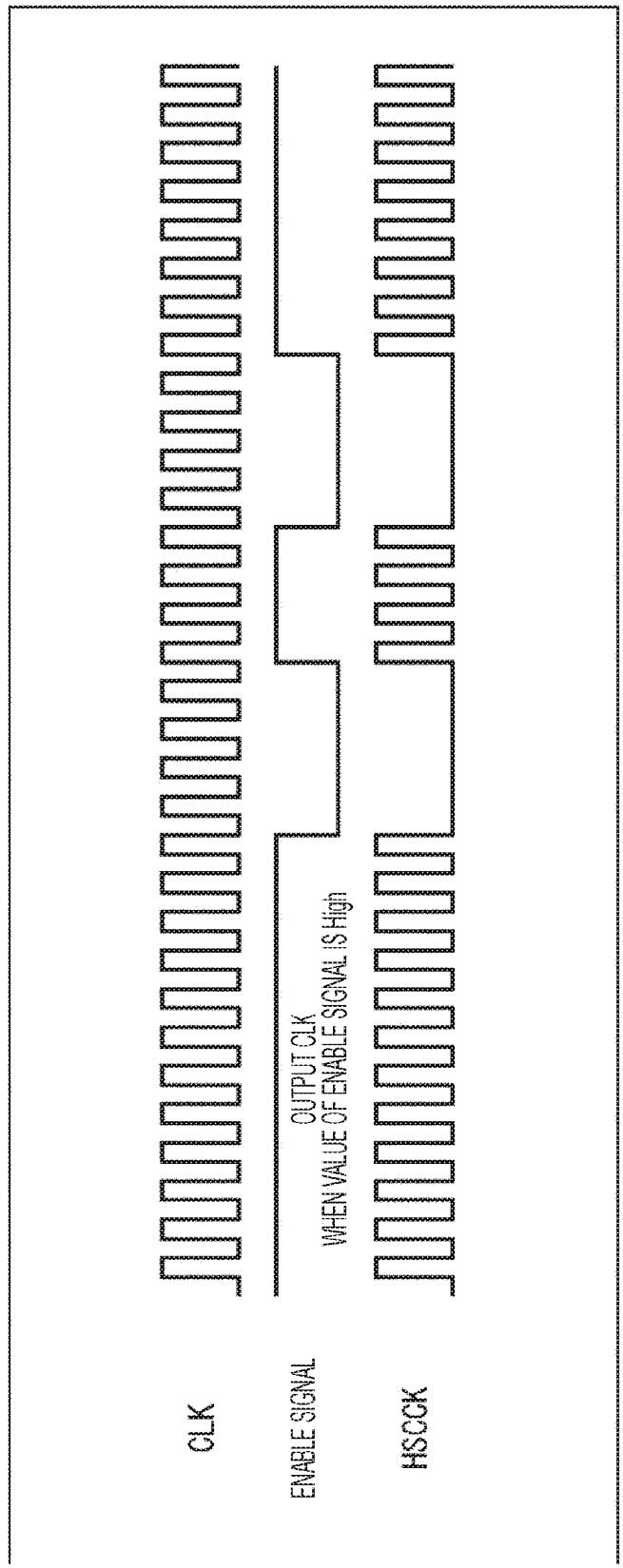
FIG. 9 is a view for describing an example of an aspect of clock control.

An example of an aspect of the clock control is illustrated in FIG. 9. As illustrated in FIG. 9, the enable signal is a binary signal of a high value and a low value, and permits the supply of the shift register clock HSCCK in a case where a value of the enable signal is high and prohibits the supply of the shift register clock HSCCK when a value of the enable signal is low. That is, the enable-type clock control unit 301 supplies the shift register clock HSCCK in a period in which the value of the enable signal is high, and stops the supply of the shift register clock HSCCK in a period in which the value of the enable signal is low.

A timing to switch the value of such an enable signal is optional, but is set depending on a desired control timing. That is, it is sufficient if the value of the enable signal is set to be low in a desired period in which the driving of the shift register 182 is desired to be stopped. For example, in a case of stopping the driving of the shift register 182 in the period in which the A/D conversion is performed as described above, the value of the enable signal in the period in which the A/D conversion is performed may be set to be low.

Note that also in a case where it is desired to stop the supply of the shift register clock HSCCK plural times, for example, as in the case of the correlated double sampling described above, it is sufficient if the value of the enable signal in each period is set to be low. In other words, in a case where the value of the enable signal is set to be low in a plurality of periods, the enable-type clock control unit 301 stops the supply of the shift register clock HSCCK in each period. That is, the supply of the shift register clock HSCCK is stopped plural times.

As described above, by controlling the supply of the shift register clock HSCCK on the basis of the value of the enable signal, it is possible to easily control the driving of the shift register 182. That is, it is possible to easily suppress the deterioration of the subjective image quality.

<Flow of Data Transfer Control Processing>

Figure 10:
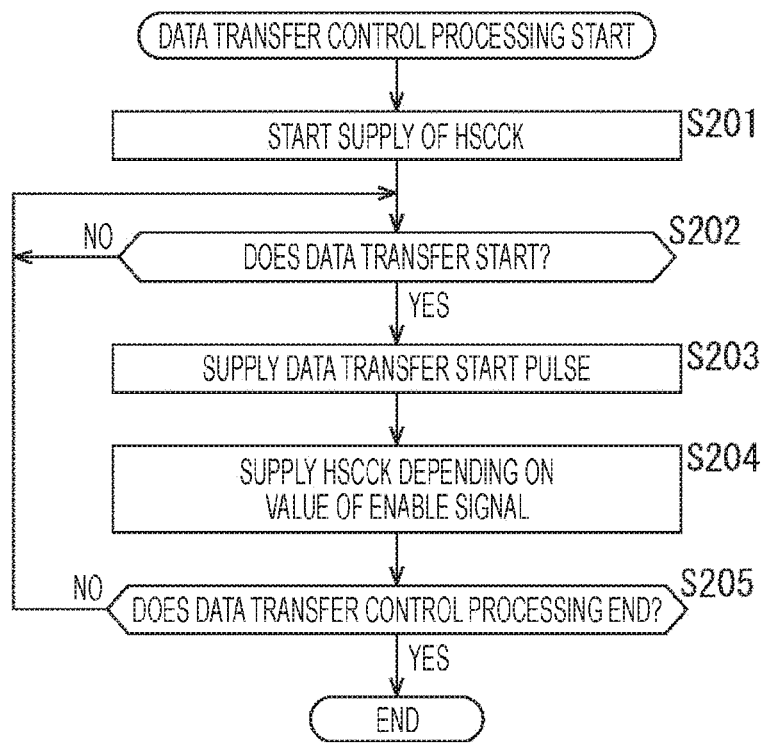
FIG. 10 is a flowchart for describing an example of a flow of data transfer control processing.

An example of a flow of data transfer control processing executed by the readout processing unit 107 in this case will be described with reference to a flowchart of FIG. 10.

When the data transfer control processing starts, the enable-type clock control unit 301 starts the supply of the shift register clock HSCCK in synchronization with the reference clock CLK in step S201.

In step S202, the trigger signal generation unit 242 determines whether or not to start the data transfer, and repeats this processing until it is determined that it is a timing to start the data transfer. Then, in a case where it is determined that it is a timing to start the data transfer, the processing proceeds to step S203.

In step S203, the trigger signal generation unit 242 supplies a pulse (data transfer start pulse) to the data transfer unit 106 (shift register 182) as the data transfer start notification signal HSTRG.

In step S204, the enable-type clock control unit 301 supplies the shift register clock HSCCK depending on the value of the enable signal. That is, the enable-type clock control unit 301 supplies the shift register clock HSCCK in a period in which the value of the enable signal is high, and stops the supply of the shift register clock HSCCK in a period in which the value of the enable signal is low. In this way, the supply of the shift register clock HSCCK is stopped during a desired period on the basis of the enable signal.

In step S205, the enable-type clock control unit 301 determines whether or not to end the data transfer control processing. In a case where it is determined that it has not been a timing to end the supply of the shift register clock HSCCK, the processing returns to step S204. That is, in step S205, the processing of step S204 and step S205 is repeated until it is determined that it has been a timing to end the supply of the shift register clock HSCCK. That is, during this period, the supply of the shift register clock HSCCK is performed depending on the value of the enable signal.

Then, when it is determined that it has been a timing to end the supply of the shift register clock HSCCK, the data transfer control processing ends. That is, the supply of the shift register clock HSCCK ends.

In this way, the readout processing unit 107 can control the supply of the shift register clock so as to suppress the current fluctuation of the sense amplifier 154 in the period in which the A/D conversion is performed. Therefore, it is possible to easily suppress the deterioration of the subjective image quality of the captured image.

4. Third Embodiment

<Control by Reset>

An example of controlling the driving of the shift register 182 by controlling the supply of the shift register clock HSCCK has been described hereinabove, but a method of controlling the driving of the shift register 182 is optional and is not limited to this example. For example, the driving of the shift register 182 may be stopped by resetting the shift register 182. Furthermore, in that case, the driving of the shift register 182 may be restarted by supplying a predetermined trigger signal to the shift register 182.

<H Scanner>

Figure 11:
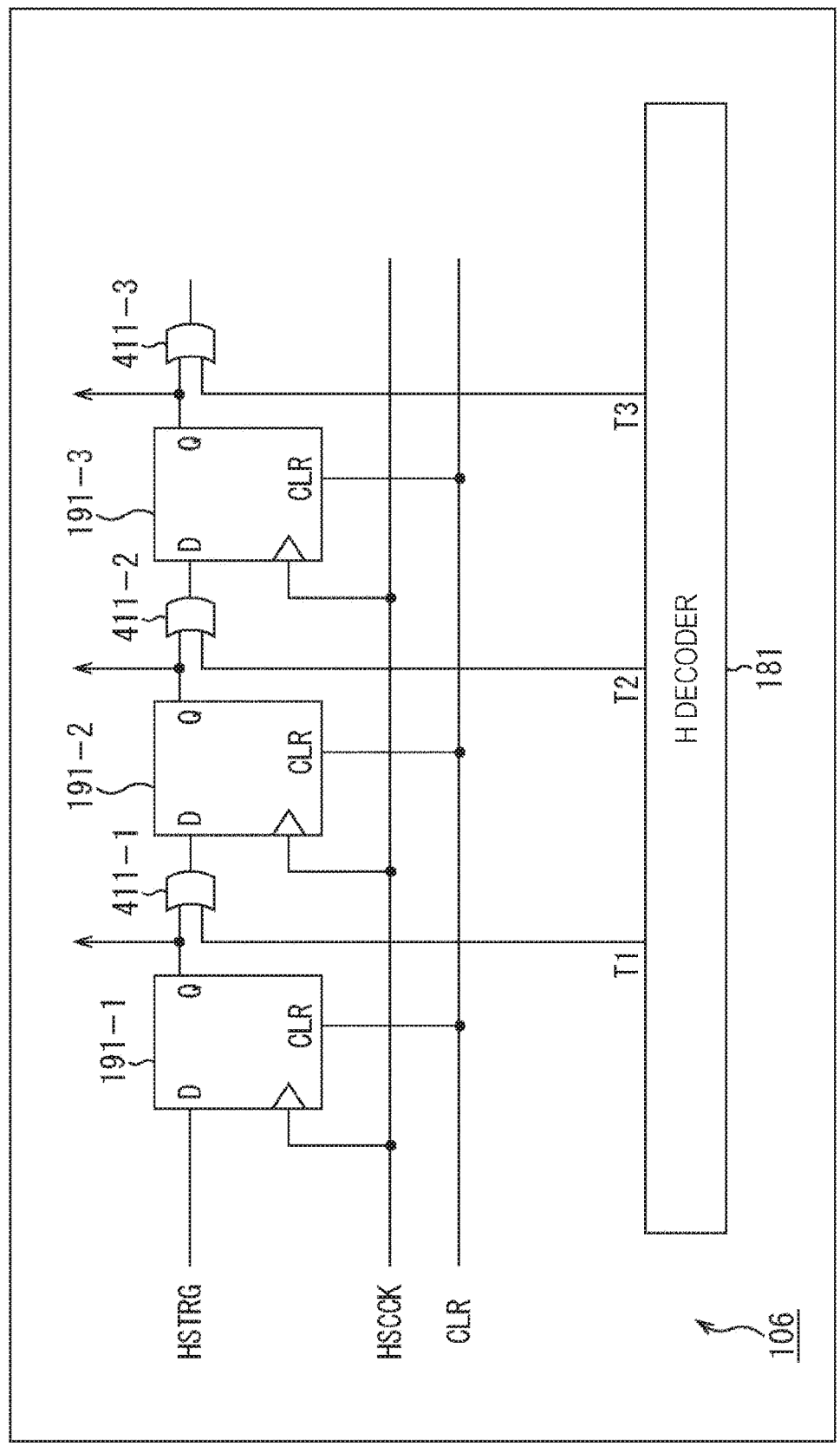
FIG. 11 is a block diagram illustrating a main configuration example of an H scanner.

A configuration example of a part of the H scanner 155 in that case is illustrated in FIG. 11. As illustrated in FIG. 11, a clear signal CLR is supplied to each flip-flop 191 of the shift register 182 in this case. Three flip-flops 191 (flip-flops 191-1 to 191-3) are illustrated in FIG. 11 for simplification of a description, but the clear signal CLR is similarly supplied to all the flip-flops 191 of the shift register 182.

This clear signal CLR is a binary signal of a high value or a low value. When the clear signal CLR whose value is high is supplied to the flip-flop 191, the flip-flop 191 is initialized. That is, the shift register 182 is initialized, such that the driving of the shift register 182 is stopped.

This clear signal CLR is supplied from, for example, the readout processing unit 107. Note that a supply source of this clear signal CLR is optional, and, for example, this clear signal may be supplied from the control unit 101 or may be supplied from the outside of the imaging element 100.

Furthermore, an OR circuit 411 is provided between the respective flip-flops 191, and a trigger signal supplied from the H decoder 181 can be supplied to the flip-flop 191 through the OR circuit 411. Three OR circuits 411 (OR circuits 411-1 to 411-3) are illustrated in FIG. 11 for simplification of a description, but the OR circuit 411 is similarly provided for all the flip-flops 191 of the shift register 182, and trigger signals (T1, T2, T3, . . . ) can be supplied from the H decoder 181 to all the flip-flops 191.

The H decoder 181 can supply the trigger signal to any flip-flop 191. That is, the H decoder 181 supplies the trigger signal to the corresponding flip-flop 191 so that the driving of the shift register 182 is restarted from a state immediately before the driving of the shift register 182 is stopped, in a case of restarting the driving of the shift register 182.

Figure 12:
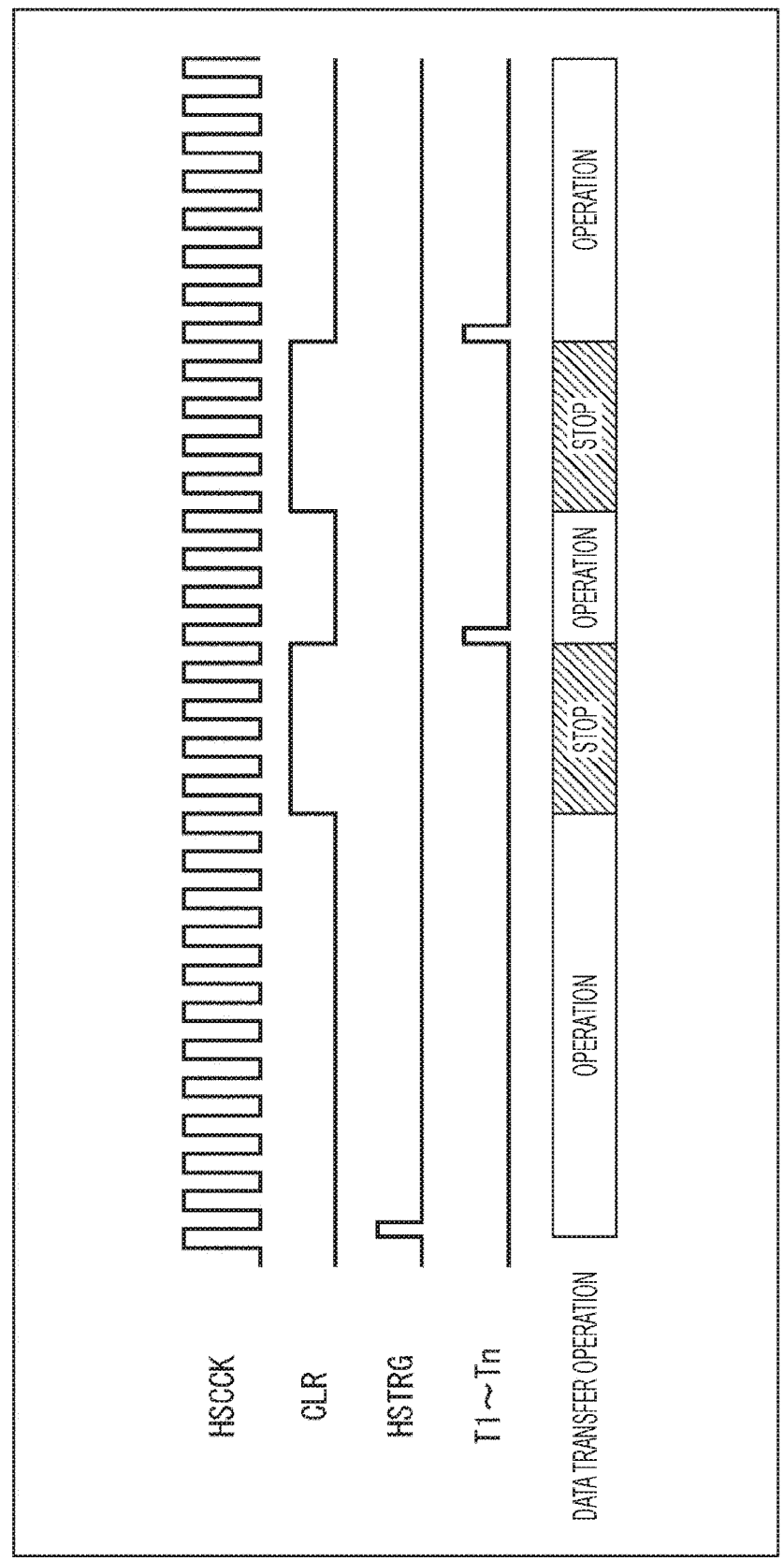
FIG. 12 is a view for describing an example of an aspect of data transfer control.

That is, as illustrated at a second stage from the top of FIG. 12, in a case of stopping the driving of the shift register 182, a value of the clear signal CLR is set to be high. In a case of restarting the driving of the shift register 182, a value of the clear signal CLR is set to be low.

Note that when the clear signal CLR becomes high, a state of the shift register 182 is initialized, and a state immediately before stopping the driving of the shift register 182 is thus managed in the H decoder 181. In other words, the H decoder 181 supplies the trigger signal to an operation restarting position of the shift register 182 in a case of restarting the driving of the shift register 182. In this way, it is possible to restart the driving of the shift register 182 from the state immediately before the driving of the shift register 182 is stopped.

A timing to switch the value of such a clear signal CLR or a supply timing of the trigger signal is optional, but is set depending on a desired control timing. That is, it is sufficient if the value of the clear signal CLR is set to be high in a desired period in which the driving of the shift register 182 is desired to be stopped. Furthermore, it is sufficient if the H decoder 181 supplies the trigger signal to an appropriate position of the shift register 182 at a timing corresponding to an end timing of the period. For example, in a case of stopping the driving of the shift register 182 in the period in which the A/D conversion is performed as described above, it is sufficient if the value of the clear signal CLR in the period in which the A/D conversion is performed is set to be high and the H decoder 181 supplies the trigger signal to an appropriate position of the shift register 182 at a timing corresponding to a timing to restart the driving of the shift register 182.

Note that also in a case where it is desired to stop the supply of the shift register clock HSCCK plural times, for example, as in the case of the correlated double sampling described above, it is sufficient if control is similarly performed for each period.

As described above, by resetting the shift register 182, it is possible to control the driving of the shift register 182. That is, it is possible to suppress the deterioration of the subjective image quality.

<Flow of Data Transfer Control Processing>

Figure 13:
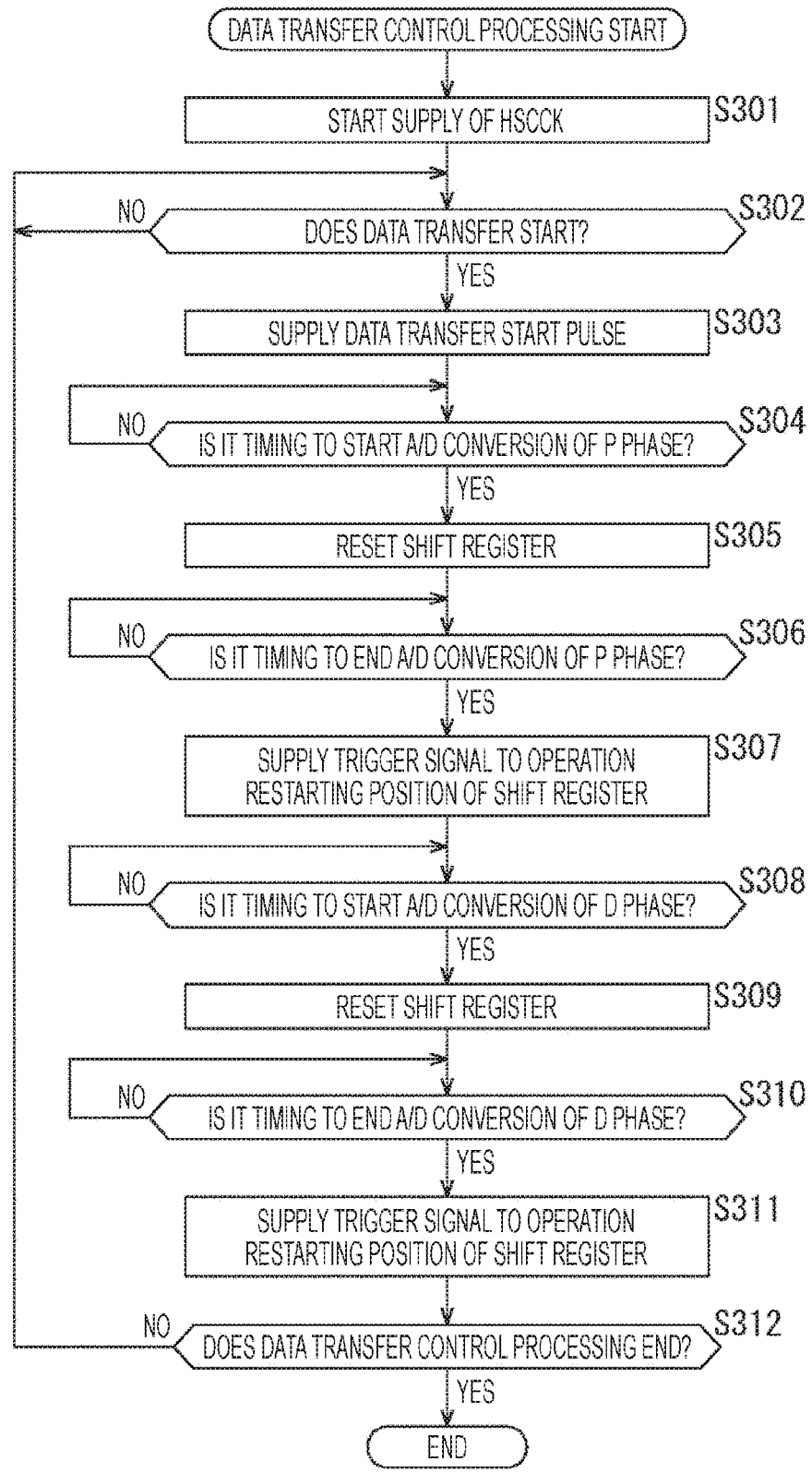
FIG. 13 is a flowchart for describing an example of a flow of data transfer control processing.

An example of a flow of data transfer control processing in this case will be described with reference to a flowchart of FIG. 13. Note that, here, a case where correlated double sampling is performed in readout of a pixel output (a case of stopping the driving of the shift register 182 is stopped in the entirety of the periods in which each A/D conversion is performed) as described with reference to FIG. 4 will be described by way of example. The readout processing unit 107 realizes the data transfer control as described above, for example, by executing processing of each step of this data transfer control processing in data transfer of each line.

When the data transfer control processing starts, the control unit 231 of the readout processing unit 107 starts the supply of the shift register clock HSCCK in synchronization with the reference clock CLK in step S301.

In step S302, the trigger signal generation unit 242 determines whether or not to start the data transfer, and repeats this processing until it is determined that it is a timing to start the data transfer. Then, in a case where it is determined that it is a timing to start the data transfer, the processing proceeds to step S303.

In step S303, the trigger signal generation unit 242 supplies a pulse (data transfer start pulse) to the data transfer unit 106 (shift register 182) as the data transfer start notification signal HSTRG.

In step S304, the control unit 231 determines whether or not it is a timing to start the A/D conversion for the pixel output in the reset period (P phase). The processing of step S304 is repeated until it is determined that it is a timing to start the A/D conversion. That is, during this period, the shift register 182 is driven.

Then, when it is determined that it is a timing to start the A/D conversion for the pixel output in the reset period (P phase), the processing proceeds to step S305. In step S305, the control unit 231 sets the value of the clear signal CLR to be high to reset the shift register 182. Thus, the driving of the shift register 182 is stopped.

In step S306, the control unit 231 determines whether or not it is a timing to end the A/D conversion for the pixel output in the reset period (P phase). The processing of step S306 is repeated until it is determined that it is a timing to end the A/D conversion. That is, during this period, the driving of the shift register 182 is stopped.

Then, when it is determined that it is a timing to end the A/D conversion for the pixel output in the reset period (P phase), the processing proceeds to step S307. In step S307, the control unit 231 sets the value of the clear signal CLR to be low to permit the driving of the shift register 182. Furthermore, the H decoder 181 supplies the trigger signal to an operation restarting position of the shift register 182. Thus, the driving of the shift register 182 is restarted from the state immediately before the driving of the shift register 182 is stopped.

In step S308, the control unit 231 determines whether or not it is a timing to start the A/D conversion for the pixel output in the signal readout period (D phase). The processing of step S308 is repeated until it is determined that it is a timing to start the A/D conversion. That is, during this period, the shift register 182 is driven.

Then, when it is determined that it is a timing to start the A/D conversion for the pixel output in the signal readout period (D phase), the processing proceeds to step S309. In step S309, the control unit 231 sets the value of the clear signal CLR to be high to reset the shift register 182. Thus, the driving of the shift register 182 is stopped.

In step S310, the control unit 231 determines whether or not it is a timing to end the A/D conversion for the pixel output in the signal readout period (D phase). The processing of step S310 is repeated until it is determined that it is a timing to end the A/D conversion. That is, during this period, the driving of the shift register 182 is stopped.

Then, when it is determined that it is a timing to end the A/D conversion for the pixel output in the signal readout period (D phase), the processing proceeds to step S311. In step S311, the control unit 231 sets the value of the clear signal CLR to be low to permit the driving of the shift register 182. Furthermore, the H decoder 181 supplies the trigger signal to an operation restarting position of the shift register 182. Thus, the driving of the shift register 182 is restarted from the state immediately before the driving of the shift register 182 is stopped.

In step S312, the control unit 231 determines whether or not to end the data transfer control processing. In a case where it is determined that the data transfer has not ended and it is not a timing to end the driving of the shift register 182, the processing of step S312 is repeated until it is determined that the data transfer has ended. That is, during this period, the shift register 182 is driven.

Then, when it is determined that the data transfer has ended, the data transfer control processing ends. That is, the driving of the shift register 182 ends.

In this way, the readout processing unit 107 can control the driving of the shift register 182 so as to suppress the current fluctuation of the sense amplifier 154 in the period in which the A/D conversion is performed. Therefore, it is possible to easily suppress the deterioration of the subjective image quality of the captured image.

In a case where the shift register 182 is reset as described above, it is necessary not only to supply the clear signal, but also to manage the state immediately before stopping the driving of the shift register 182, such that it is necessary to appropriately supply the trigger signal at the time of restarting the driving of the shift register 182.

On the other hand, when the supply of the shift register clock HSCCK is controlled as in the first embodiment or the second embodiment, it is possible to more easily control the driving of the shift register 182.

5. Fourth Embodiment

<Data Transfer Control by Others>

Note that a method of suppressing the current fluctuation of the sense amplifier during the A/D conversion is not limited to the example described above. For example, the data transfer may not end during the A/D conversion by delaying a start timing of the data transfer. In this way, it is possible to suppress occurrence of significant current fluctuation of the sense amplifier 154 during the A/D conversion due to the end of the data transfer.

However, in a case of this method, it is not possible to suppress an influence of gentle current fluctuation of the sense amplifier 154 during the data transfer. Therefore, the methods described in the first to third embodiments can suppress the current fluctuation of the sense amplifier 154 more certainly than this method can, and can further suppress the deterioration of the subjective image quality of the captured image.

Furthermore, the data transfer may not end during the A/D conversion by performing an unnecessary data transfer operation. In this way, it is possible to suppress occurrence of significant current fluctuation of the sense amplifier 154 during the A/D conversion due to the end of the data transfer.

However, also in a case of this method, it is not possible to suppress an influence of gentle current fluctuation of the sense amplifier 154 during the data transfer. Therefore, the methods described in the first to third embodiments can suppress the current fluctuation of the sense amplifier 154 more certainly than this method can, and can further suppress the deterioration of the subjective image quality of the captured image.

Note that, in these methods, a function of suppressing the gentle current fluctuation of the sense amplifier 154 during the data transfer may be further added. However, in that case, a configuration and processing become more complicated, such that there is a possibility that a circuit size and cost will increase. Therefore, the methods described in the first to third embodiments can suppress the current fluctuation of the sense amplifier 154 more easily than this method can, and can further suppress the deterioration of the subjective image quality of the captured image.

Furthermore, a dedicated function for interrupting the driving of the shift register 182 may be added to the shift register 182. However, in that case, a configuration and processing become more complicated, such that there is a possibility that a circuit size and cost will increase. Therefore, the methods described in the first to third embodiments can suppress the current fluctuation of the sense amplifier 154 more easily than this method can, and can further suppress the deterioration of the subjective image quality of the captured image.

<Other Configurations>

It has been described hereinabove that the pixel outputs are read out row by row from the pixel array unit 102, but a readout order of the pixel outputs is optional. Furthermore, it has been described hereinabove that the column A/D conversion unit 105 performs the A/D conversion on the pixel outputs of each column row by row, but a configuration of the A/D conversion is optional, and the A/D conversion may be performed on each pixel output read out from the pixel array unit 102 in any order. For example, a plurality of A/D conversion units may be provided for each column and the A/D conversion may be performed on the pixel outputs by the plurality of A/D conversion units. Furthermore, for example, one A/D conversion unit may be shared by a plurality of columns.

Furthermore, for example, one A/D conversion unit may be provided in the imaging element 100, and the A/D conversion may be performed on the pixel outputs pixel by pixel by the A/D conversion unit. Furthermore, for example, an A/D conversion unit may be provided for each line of the pixel array unit 102, and the A/D conversion may be performed on the pixel outputs column by column by each A/D conversion unit. Furthermore, for example, an A/D conversion unit may be provided for each predetermined area of the pixel array unit 102, and the A/D conversion may be performed on the pixel outputs of each area by each A/D conversion unit.

Furthermore, it has been described hereinabove that the pixel data are transferred to the sense amplifier 154 line by line, but the transfer of the pixel data may be performed in any unit, for example, column by column, region by region or the like. Furthermore, it has been described hereinabove that the current fluctuation of the sense amplifier 154 is suppressed, but a current fluctuation suppression target according to the present technology is not limited to the sense amplifier 154 as long as an influence of the current fluctuation due to the data transfer on the A/D conversion result can be suppressed. That is, the current fluctuation suppression target according to the present technology includes those other than the sense amplifier 154 as long as the current fluctuation is due to the data transfer.

Furthermore, the configurations of the imaging element 100 illustrated in FIG. 2 may be formed on a single semiconductor substrate (hereinafter, simply referred to as a substrate) or may be formed on a plurality of substrates. In a case where these configurations are formed on the plurality of substrates, each configuration illustrated in FIG. 2 may be arranged on each substrate.

For example, the readout processing unit 107 may be arranged on one substrate, and the other configurations may be arranged on another substrate. Furthermore, the readout processing unit 107 and the control unit 101 may be arranged on one substrate, and the other configurations may be arranged on another substrate. Furthermore, the readout processing unit 107 and the data transfer unit 106 may be arranged on one substrate, and the other configurations may be arranged on another substrate. Of course, combinations other than these combinations may be used.

Furthermore, in a case where the configurations of the imaging element 100 illustrated in FIG. 2 are formed on the plurality of substrates, they may be configured as one chip (for example, a chip in which they are subjected to mold sealing or the like to be integrated with one another) including all the substrates or may be configured as a plurality of chips including different substrates.

For example, the configurations of the imaging element 100 may be configured as one chip in which a plurality of substrates is stacked and circuits of the respective substrates are connected to one another through vias or the like. Furthermore, the configurations of the imaging element 100 may be a module in which a plurality of chips is modularized.

6. Fifth Embodiment

<Imaging Device>

Figure 14:
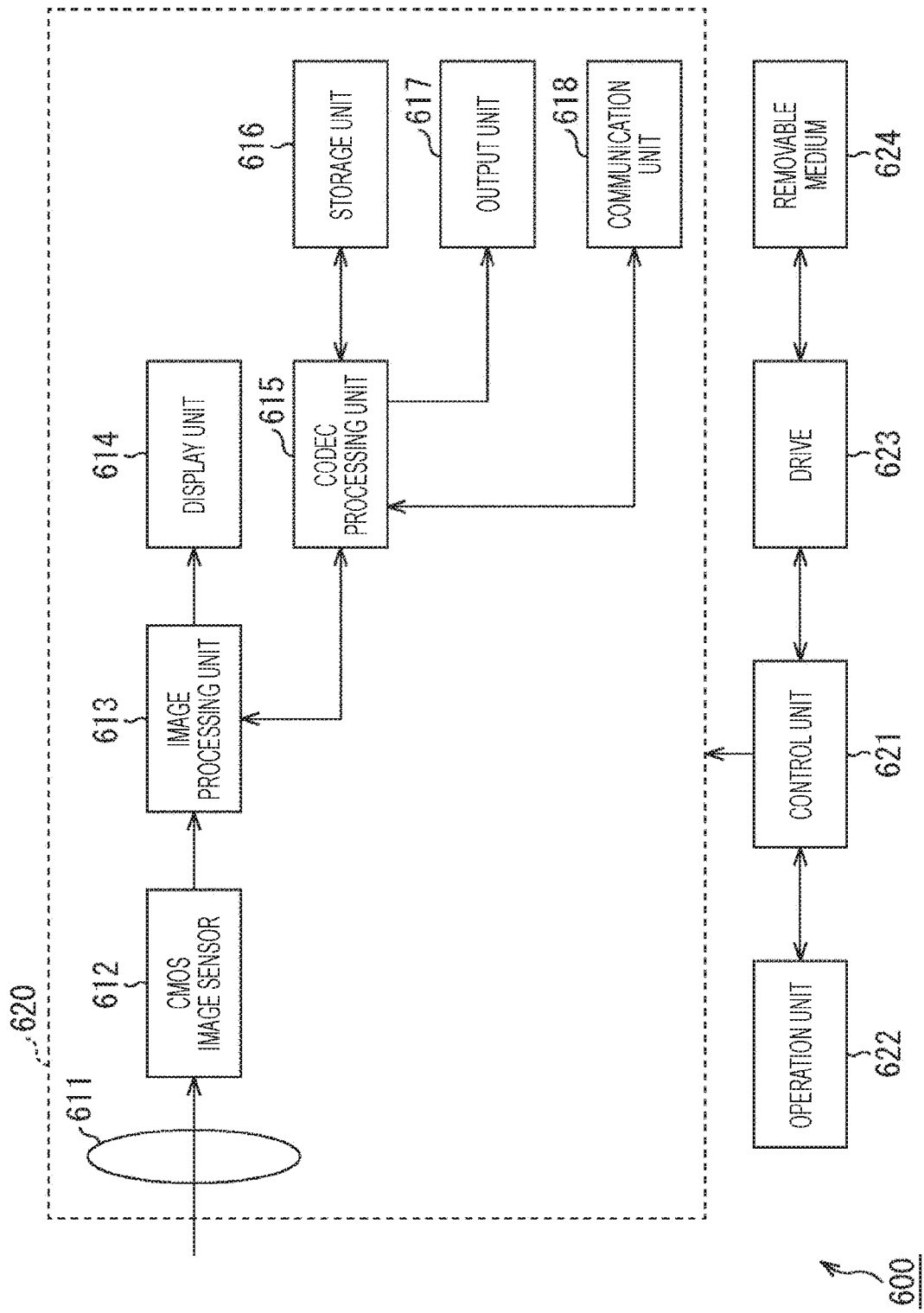
FIG. 14 is a block diagram illustrating a main configuration example of an imaging device.

Note that the present technology can be applied to devices other than the imaging element. For example, the present technology may be applied to an apparatus (an electronic apparatus or the like) having an imaging element, such as an imaging device. FIG. 14 is a block diagram illustrating a main configuration example of an imaging device as an example of an electronic apparatus to which the present technology is applied. An imaging device 600 illustrated in FIG. 14 is an apparatus capturing an image of a subject and outputting the image of the subject as an electrical signal.

As illustrated in FIG. 14, the imaging device 600 includes an optical unit 611, a CMOS image sensor 612, an image processing unit 613, a display unit 614, a codec processing unit 615, a storage unit 616, an output unit 617, a communication unit 618, and a control unit 621, an operation unit 622, and a drive 623.

The optical unit 611 includes a lens adjusting a focus to the subject and collecting light from an in-focus position, a diaphragm adjusting exposure, a shutter controlling a timing of image capturing, and the like. The optical unit 611 transmits light (incident light) from the subject therethrough and supplies the incident light to the CMOS image sensor 612.

The CMOS image sensor 612 photoelectrically converts the incident light to perform A/D conversion on a signal (pixel signal) for each pixel, performs signal processing such as CDS or the like, and supplies captured image data after being processed to the image processing unit 613.

The image processing unit 613 performs image processing on the captured image data obtained by the CMOS image sensor 612. More specifically, the image processing unit 613 performs various types of image processing, for example, color mixture correction, black level correction, white balance adjustment, demosaic processing, matrix processing, gamma correction, YC conversion, and the like, on the captured image data supplied from the CMOS image sensor 612. The image processing unit 613 supplies the captured image data on which the image processing is performed to the display unit 614.

The display unit 614 includes, for example, a liquid crystal display or the like, and displays the image (for example, the image of the subject) of the captured image data supplied from the image processing unit 613.

The image processing unit 613 further supplies the captured image data on which the image processing is performed to the codec processing unit 615 as necessary.

The codec processing unit 615 performs coding processing in a predetermined manner on the captured image data supplied from the image processing unit 613, and supplies the obtained coded data to the storage unit 616. Furthermore, the codec processing unit 615 reads out the coded data recorded in the storage unit 616, decodes the coded data to generate decoded image data, and supplies the decoded image data to the image processing unit 613.

The image processing unit 613 performs predetermined image processing on the decoded image data supplied from the codec processing unit 615. The image processing unit 613 supplies the decoded image data on which the image processing is performed to the display unit 614. The display unit 614 includes, for example, a liquid crystal display or the like, and displays the image of the decoded image data supplied from the image processing unit 613.

Furthermore, the codec processing unit 615 may supply the coded data obtained by coding the captured image data supplied from the image processing unit 613 or the coded data of the captured image data read out from the storage unit 616 to the output unit 617, and output the coded data to the outside of the imaging device 600. Furthermore, the codec processing unit 615 may supply the captured image data before being coded or the decoded image data obtained by decoding the coded data read out from the storage unit 616 to the output unit 617 and output the captured image data or the decoded image data to the outside of the imaging device 600.

Moreover, the codec processing unit 615 may transmit the captured image data, the coded data of the captured image data, or the decoded image data to another apparatus through the communication unit 618. Furthermore, the codec processing unit 615 may acquire the captured image data and the coded data of the image data through the communication unit 618. The codec processing unit 615 appropriately performs coding, decoding, and the like on the captured image data or the coded data of the image data acquired through the communication unit 618. The codec processing unit 615 may supply the obtained image data or coded data to the image processing unit 613, as described above, or output the obtained image data or coded data to the storage unit 616, the output unit 617, and the communication unit 618.

The storage unit 616 stores the coded data and the like supplied from the codec processing unit 615. The coded data stored in the storage unit 616 is read out and decoded by the codec processing unit 615 as necessary. The captured image data obtained by the decoding processing is supplied to the display unit 614, and a captured image corresponding to the captured image data is displayed by the display unit.

The output unit 617 includes an external output interface such as an external output terminal or the like, and outputs various data supplied through the codec processing unit 615 to the outside of the imaging device 600 through the external output interface.

The communication unit 618 supplies various types of information such as the image data, the coded data or the like supplied from the codec processing unit 615 to another apparatus, which is a communication counterpart of predetermined communication (wired communication or wireless communication). Furthermore, the communication unit 618 acquires various types of information such as image data, coded data or the like from another apparatus, which is the communication counterpart of the predetermined communication (wired communication or wireless communication), and supplies the various types of information to the codec processing unit 615.

The control unit 621 includes a predetermined digital circuit or the like, and performs processing related to control of operations of each processing unit (each processing unit illustrated in a dotted line 620, the operation unit 622, and the drive 623) of the imaging device 600. Note that the control unit 621 includes, for example, a CPU, a ROM, a RAM, and the like, and the CPU may perform various processings related to such control by executing a program and data loaded from the ROM and the like into the RAM.

The operation unit 622 includes, for example, any input device such as a jog dial (trademark), a key, a button, a touch panel, or the like, receives an operation input by, for example, a user or the like and supplies a signal corresponding to the operation input to the control unit 621.

The drive 623 reads out information stored in a removable medium 624 such as, for example, a magnetic disk, an optical disk, a magneto-optical disk, a semiconductor memory, or the like, mounted on the drive 623. The drive 623 reads out various types of information such as a program, data or the like from the removable medium 624 and supplies the various types of information to the control unit 621. Furthermore, in a case where a writable removable medium 624 is mounted on the drive 623, the drive 623 causes various types of information such as, for example, image data, coded data or the like supplied through the control unit 621 to be stored in the removable medium 624.

The present technology described above in each embodiment is applied as the CMOS image sensor 612 of the imaging device 600 as described above. In other words, the imaging element 100 described above is used as the CMOS image sensor 612. Thus, the CMOS image sensor 612 can suppress the deterioration of the image quality of the captured image. Therefore, the imaging device 600 can obtain a captured image having a higher image quality by capturing the image of the subject.

7. Application Example to Moving Body

The technology according to the present disclosure (the present technology) can be applied to various products. For example, the technology according to the present disclosure may be realized as a device mounted in any type of moving object such as a vehicle, an electric vehicle, a hybrid electric vehicle, a motorcycle, a bicycle, a personal mobility, an airplane, a drone, a ship, a robot, and the like.

Figure 15:
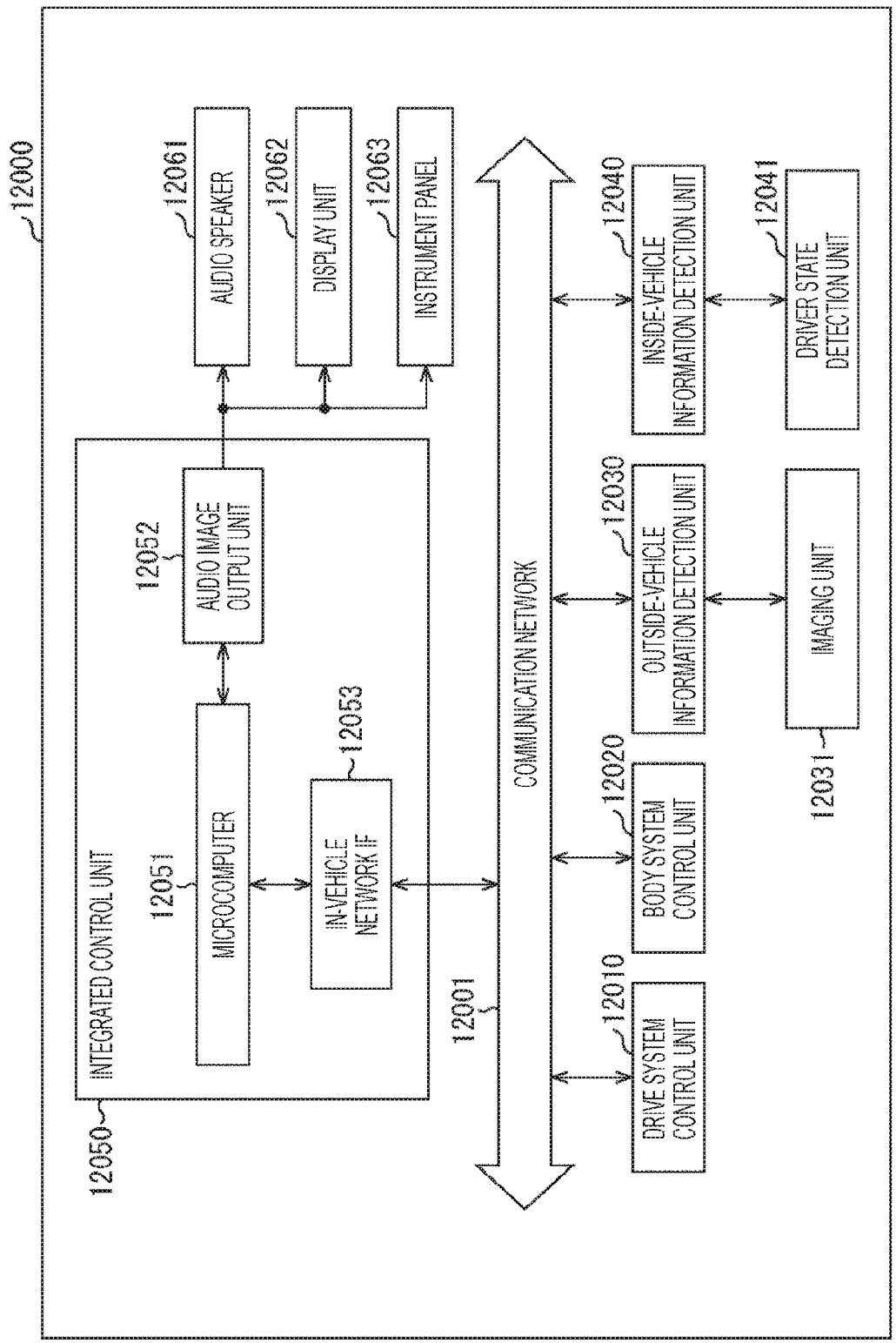
FIG. 15 is a block diagram illustrating an example of a schematic configuration of a vehicle control system.

FIG. 15 is a block diagram illustrating a schematic configuration example of a vehicle control system which is an example of a moving body control system to which the technology according to the present disclosure can be applied.

A vehicle control system 12000 includes a plurality of electronic control units connected to each other through a communication network 12001. In the example illustrated in FIG. 15, the vehicle control system 12000 includes a drive system control unit 12010, a body system control unit 12020, an outside-vehicle information detection unit 12030, an inside-vehicle information detection unit 12040, and an integrated control unit 12050. Furthermore, as a functional configuration of the integrated control unit 12050, a microcomputer 12051, an audio image output unit 12052, and an in-vehicle network interface (I/F) 12053 are illustrated.

The drive system control unit 12010 controls an operation of a device related to a drive system of a vehicle according to various programs. For example, the drive system control unit 12010 functions as a control device such as a driving force generation device for generating a driving force of the vehicle, such as an internal combustion engine or a drive motor, a driving force transfer mechanism for transferring the driving force to wheels, a steering mechanism for adjusting a steering angle of the vehicle, and a braking device for generating a braking force of the vehicle.

The body system control unit 12020 controls operations of various devices mounted on a vehicle body according to the various programs. For example, the body system control unit 12020 functions as a keyless entry system, a smart key system, a power window device, or a control device of various lamps such as a headlamp, a back lamp, a brake lamp, a blinker, or a fog lamp. In this case, the body system control unit 12020 can receive electric waves or signals of various switches transmitted from a portable device substituting for a key. The body system control unit 12020 receives inputs of these electric waves or signals, and controls a door lock device, a power window device, a lamp, and the like of the vehicle.

The outside-vehicle information detection unit 12030 detects information regarding the outside of the vehicle in which the vehicle control system 12000 is mounted. For example, an imaging unit 12031 is connected to the outside-vehicle information detection unit 12030. The outside-vehicle information detection unit 12030 causes the imaging unit 12031 to capture a vehicle external image, and receives the captured image. The outside-vehicle information detection unit 12030 may perform object detection processing or distance detection processing of a person, a vehicle, an obstacle, a sign, characters on a road surface, or the like on the basis of the received image.

The imaging unit 12031 is an optical sensor that receives light and outputs an electrical signal depending on an amount of received light. The imaging unit 12031 can output the electrical signal as an image or can output the electrical signal as measured distance information. Furthermore, the light received by the imaging unit 12031 may be visible light or may be non-visible light such as infrared light.

The inside-vehicle information detection unit 12040 detects information regarding the inside of the vehicle. For example, a driver state detection unit 12041 detecting a state of a driver is connected to the inside-vehicle information detection unit 12040. The driver state detection unit 12041 includes, for example, a camera capturing an image of the driver, and the inside-vehicle information detection unit 12040 may calculate a fatigue degree or a concentration degree of the driver on the basis of detected information input from the driver state detection unit 12041 or may determine whether or not the driver is dozing.

The microcomputer 12051 can calculate a control target value of the driving force generation device, the steering mechanism, or the braking device on the basis of the information regarding the inside or the outside of the vehicle acquired by the outside-vehicle information detection unit 12030 or the inside-vehicle information detection unit 12040 and output a control command to the drive system control unit 12010. For example, the microcomputer 12051 can perform cooperation control for the purpose of realizing a function of an advanced driver assistance system (ADAS) including collision avoidance or shock mitigation of the vehicle, following traveling based on an inter-vehicle distance, vehicle speed maintenance traveling, collision warning of the vehicle, lane departure warning of the vehicle, and the like.

Furthermore, the microcomputer 12051 can perform cooperative control for the purpose of automatic driving or the like in which the vehicle autonomously travels without depending on a driver's operation by controlling the driving force generating device, the steering mechanism, the braking device, or the like, on the basis of the surrounding information of the vehicle acquired by the outside-vehicle information detection unit 12030 or the inside-vehicle information detection unit 12040.

Furthermore, the microcomputer 12051 can output a control command to the body system control unit 12020 on the basis of the information regarding the outside of the vehicle acquired by the outside-vehicle information detection unit 12030. For example, the microcomputer 12051 can perform cooperative control for the purpose of achieving antiglare such as switching a high beam into a low beam by controlling the headlamp depending on a position of the preceding vehicle or an oncoming vehicle detected by the outside-vehicle information detection unit 12030.

The audio image output unit 12052 transmits at least one of an audio output signal or an image output signal to an output device capable of visually or auditorily notifying a passenger or the outside of the vehicle of information. In the example of FIG. 15, an audio speaker 12061, a display unit 12062, and an instrument panel 12063 are illustrated as the output device. The display unit 12062 may include, for example, at least one of an on-board display or a head-up display.

Figure 16:
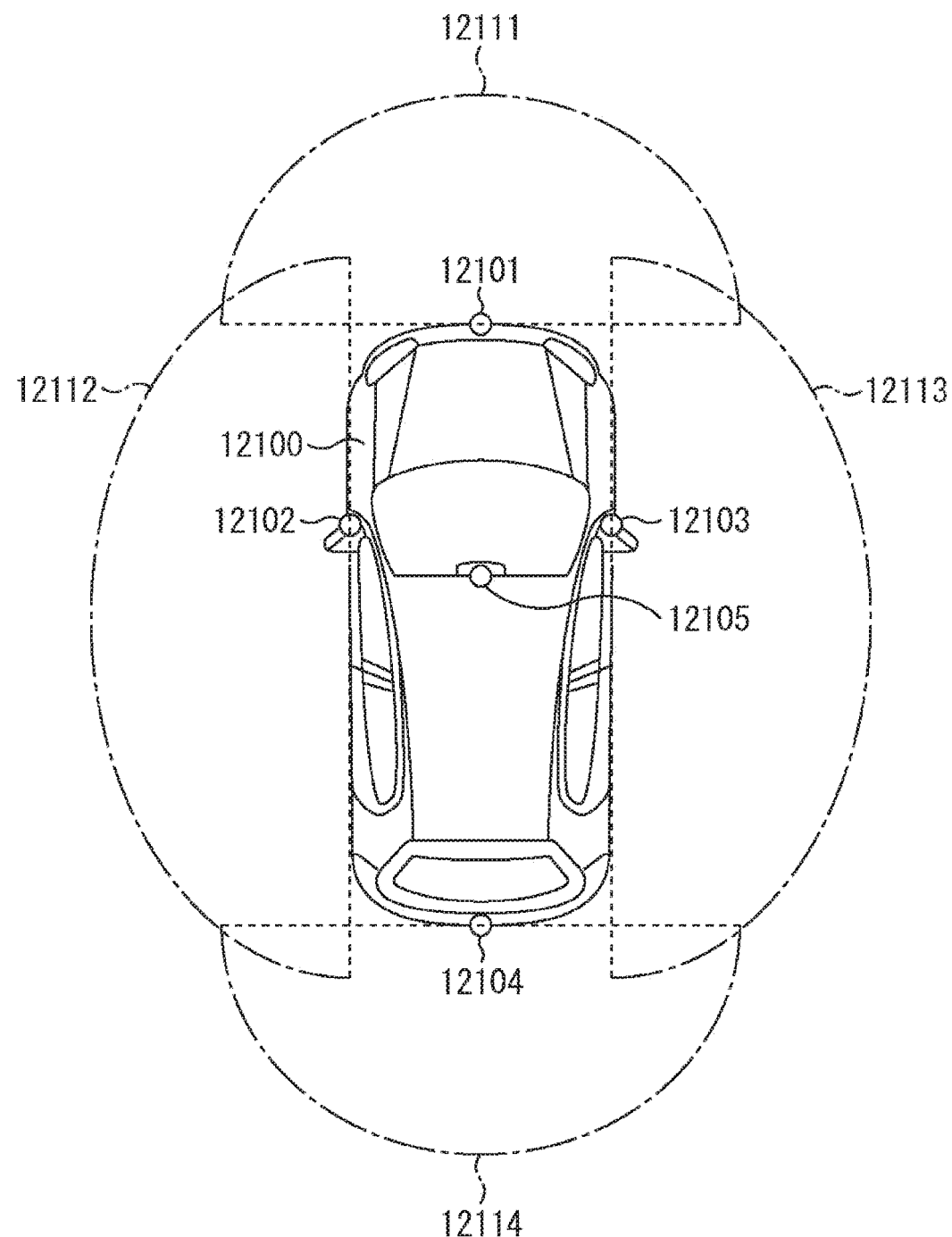
FIG. 16 is an explanatory view illustrating an example of installation positions of an outside-vehicle information detection unit and an imaging unit.

FIG. 16 is a view illustrating an example of an installation position of the imaging unit 12031.

In FIG. 16, a vehicle 12100 includes imaging units 12101, 12102, 12103, 12104, and 12105 as the imaging unit 12031.

The imaging units 12101, 12102, 12103, 12104, and 12105 are provided, for example, at positions such as a front nose, side mirrors, a rear bumper, a back door, and an upper portion of a windshield of a vehicle interior, of the vehicle 12100. The imaging unit 12101 included in the front nose and the imaging unit 12105 included in the upper portion of the windshield of the vehicle interior mainly acquire images of a region in front of the vehicle 12100. The imaging units 12102 and 12103 included in the side mirrors mainly acquire images of side regions of the vehicle 12100. The imaging units 12104 included in the rear bumper or the back door mainly acquire an image of a region behind the vehicle 12100. The images of the region in front of the vehicle acquired by the imaging units 12101 and 12105 are mainly used to detect the preceding vehicle, a pedestrian, an obstacle, a traffic light, a traffic sign, a lane, or the like.

Note that FIG. 16 illustrates an example of imaging ranges of the imaging units 12101 to 12104. An imaging range 12111 indicates an imaging range of the imaging unit 12101 provided on the front nose, imaging ranges 12112 and 12113 indicate imaging ranges of the imaging units 12102 and 12103 provided on the side mirrors, respectively, and an imaging range 12114 indicates an imaging range of the imaging unit 12104 provided in the rear bumper or the back door. For example, by overlaying image data captured by the imaging units 12101 to 12104 with each other, a bird's eye view image of the vehicle 12100 viewed from above can be obtained.

At least one of the imaging units 12101 to 12104 may have a function of acquiring distance information. For example, at least one of the imaging units 12101 to 12104 may be a stereo camera including a plurality of imaging elements or may be an imaging element having pixels for detecting a phase difference.

For example, the microcomputer 12051 can extract, in particular, a three-dimensional object that is the closest three-dimensional object on a traveling road of the vehicle 12100 and travels at a predetermined speed (for example, 0 km/h or more) in substantially the same direction that of the vehicle 12100 as the preceding vehicle by calculating a distance to each three-dimensional object in the imaging ranges 12111 to 12114 and a temporal change (a relative velocity to the vehicle 12100) in this distance on the basis of the distance information acquired from the imaging units 12101 to 12104. Moreover, the microcomputer 12051 can set an inter-vehicle distance to be secured in advance in front of the preceding vehicle and perform automatic brake control (including following stop control), automatic acceleration control (including following start control), and the like. As described above, it is possible to perform the cooperative control for the purpose of the automatic driving or the like in which the vehicle autonomously travels without depending on the driver's operation.

For example, the microcomputer 12051 can classify and extract three-dimensional object data related to the three-dimensional objects into other three-dimensional objects such as a two-wheeled vehicle, an ordinary vehicle, a large vehicle, a pedestrian, and a telephone pole, on the basis of the distance information acquired from the imaging units 12101 to 12104, and use the three-dimensional object data for automatic avoidance of an obstacle. For example, the microcomputer 12051 identifies obstacles around the vehicle 12100 as obstacles visible to the driver of the vehicle 12100 and obstacles invisible to the driver of the vehicle 12100. Then, the microcomputer 12051 can perform driving support for collision avoidance by determining a collision risk indicating a risk of collision with each obstacle and outputting a warning to the driver through the audio speaker 12061 or the display unit 12062 or performing forced deceleration or avoidance steering through the drive system control unit 12010 in a situation where the collision risk is a set value or more, so there is a possibility of collision.

At least one of the imaging units 12101 to 12104 may be an infrared camera detecting infrared light. For example, the microcomputer 12051 can recognize a pedestrian by determining whether or not the pedestrian is present in the images captured of the imaging units 12101 to 12104. Such recognition of the pedestrian is performed by, for example, a procedure for extracting feature points in images captured by the imaging units 12101 to 12104 as the infrared camera and a procedure of performing pattern matching processing on a series of feature points indicating an outline of an object to distinguish whether or not the object is the pedestrian. When the microcomputer 12051 determines that the pedestrian is present in the images captured by the imaging units 12101 to 12104 and recognizes the pedestrian, the audio image output unit 12052 controls the display unit 12062 to superimpose and display a rectangular outline for emphasizing the recognized pedestrian. Furthermore, the audio image output unit 12052 may control the display unit 12062 to display an icon or the like indicating the pedestrian on a desired position.

An example of the vehicle control system to which the technology according to the present disclosure can be applied has been described hereinabove. The technology according to the present disclosure can be applied to the imaging unit 12031 among the configurations described above. Specifically, the imaging element 100 of FIG. 2 or the imaging device 600 of FIG. 14 can be applied to the imaging unit 12031. By applying the technology according to the present disclosure to the imaging unit 12031, it is possible to suppress the deterioration of the subjective image quality and obtain a captured image having a higher image quality, and the outside-vehicle information detection unit 12030 can thus perform object detection processing, distance detection processing, or the like, of a person, a vehicle, an obstacle, a sign, characters on a road surface, or the like, with a higher accuracy. Thus, the microcomputer 12051 can perform cooperative control for the purpose of realization of an advanced driver assistance system (ADAS) function, automatic driving, or the like, cooperative control for the purpose of achieving antiglare such as switching a high beam into a low beam, or the like, with a higher accuracy.

8. Others

<Software>

The series of processings described above can be executed by hardware or can be executed by software. Furthermore, some processings can be executed by hardware and the other processings can be executed by software. In a case where the series of processings are executed by software, a program or data constituting the software is installed.

For example, in a case of the imaging device 600 of FIG. 14, this program and data can be recorded and applied to the removable medium 624 as a package medium or the like. In that case, the program or the data can be controlled by the control unit 621 by mounting the removable media 624 on the drive 623 and be installed in the control unit 621 or the CMOS image sensor 612 (the control unit 101, the readout processing unit 107 or the like of the imaging element 100).

Furthermore, this program or data can also be provided through a wired or wireless transmission medium such as a local area network, the Internet, or digital satellite broadcasting. In that case, the program or the data can be received by the communication unit 618 and be installed in the control unit 621 or the CMOS image sensor 612.

Moreover, this program and data can be installed in advance in the ROM or the like of the control unit 621 or the CMOS image sensor 612.

<Supplement>

The embodiments of the present technology are not limited to the embodiments described above, and various modifications can be made without departing from the scope of the present technology.

For example, the present technology can be implemented as all configurations that configure an apparatus or a system, for example, a processor as a system large scale integration (LSI) or the like, a module using a plurality of processors or the like, a unit using a plurality of modules or the like, a set in which other functions are further added to the unit, or the like (in other words, some of the configurations of the apparatus).

Note that, in the present specification, the system means a set of a plurality of components (apparatuses, modules (parts), or the like), and it does not matter whether or not all the components are in the same housing. Therefore, both of a plurality of apparatuses housed in separate housings and connected to each other through a network and one apparatus in which a plurality of modules is housed in one housing are systems.

Furthermore, the processing unit described above may be realized by any configuration as long as it has the function described for the processing unit. For example, the processing unit may be configured by any circuit, an LSI, a system LSI, a processor, a module, a unit, a set, a device, an apparatus, a system, or the like. Furthermore, they may be combined with one another in a plural form. For example, the same type of configurations may be combined with one another like a plurality of circuits, a plurality of processors, or the like, or different types of configurations may be combined with one another like a circuit and an LSI or the like.

Furthermore, for example, the configuration described as one apparatus (or processing unit) may be divided and configured as a plurality of apparatuses (or processing units). Conversely, the configurations described as a plurality of apparatuses (or processing units) in the above may be gathered and configured as one apparatus (or processing unit). Furthermore, it goes without saying that configurations other than those described above may be added to the configuration of each apparatus (or each processing unit). Moreover, some of configurations of any apparatus (or processing unit) may be included in the configurations of another apparatus (or other processing unit) if the configuration or operation of the entire system is substantially the same.

Furthermore, for example, the present technology can have a configuration of cloud computing in which one function is shared and jointly processed by a plurality of apparatuses through a network.

Furthermore, for example, the program described above can be executed in any apparatus. In that case, it is sufficient if the apparatus can have necessary functions (functional blocks and the like) to obtain necessary information.

Furthermore, for example, the respective steps described in the abovementioned flowchart can be executed by one apparatus or can be executed in a shared manner by a plurality of apparatuses. Moreover, in a case where a plurality of processings is included in one step, the plurality of processings included in one step can be executed by one apparatus or can be executed in a shared manner by a plurality of apparatuses. In other words, the plurality of processings included in one step can be executed as processings of a plurality of steps. Conversely, the processings described as a plurality of steps can be collectively executed as one step.

In a program executed by a computer, processings of steps describing the program may be executed in time series according to the order described in the present specification or may be individually executed in parallel with one another or at a necessary timing such as a timing when a call is made, or the like. That is, as long as a contradiction does not occur, the processings of the respective steps may be performed in an order different from the order described above. Moreover, processing of a step of describing this program may be executed in parallel with processing of another program or may be executed in combination with the processing of another program.

The present technology described plural times in the present specification can be implemented independently alone as long as a contradiction does not occur. Of course, any plurality of the present technologies may be used in combination with one another. For example, a part or the entirety of the present technology described in any of the embodiments can be implemented in combination with a part or the entirety of the present technology described in the other embodiments. Furthermore, a part or all of any the present technology described above may be implemented in combination with other technologies that are not described above.

Note that the present technology can also have the following configuration.

(1) A signal processing apparatus including:
a control unit that stops driving of a shift register controlling transfer of pixel data of digital data obtained by A/D conversion in a part or the entirety of a period in which the A/D conversion is performed on a pixel output of an analog signal.

(2) The signal processing apparatus according to (1), in which the control unit stops the driving of the shift register from a start timing of the period in which the A/D conversion is performed.

(3) The signal processing apparatus according to (2), in which the control unit stops the driving of the shift register in a part or the entirety of a period in which A/D conversion is performed on a pixel output in a reset period of correlated double sampling and a period in which A/D conversion is performed on a pixel output in a signal readout period of the correlated double sampling.

(4) The signal processing apparatus according to (3), in which the control unit stops the driving of the shift register in the entirety of the period in which the A/D conversion is performed on the pixel output in the reset period and a period longer than the period in which the A/D conversion is performed on the pixel output in the reset period within the period in which the A/D conversion is performed on the pixel output in the signal readout period.

(5) The signal processing apparatus according to any one of (1) to (4), in which the shift register controls transfer of the pixel data by controlling driving of a holding unit holding the pixel data and a sense amplifier converting the pixel data read out from the holding unit from a current to a voltage.

(6) The signal processing apparatus according to (5), in which the control unit stops the driving of the shift register by stopping supply of a shift register clock for driving the shift register and restarts the driving of the shift register by restarting the supply of the shift register clock.

(7) The signal processing apparatus according to (6), in which the control unit counts a predetermined reference clock and stops and restarts the supply of the shift register clock on the basis of the count value.

(8) The signal processing apparatus according to (6) or (7), in which the control unit stops and restarts the supply of the shift register clock on the basis of an enable signal.

(9) The signal processing apparatus according to any one of (5) to (8), in which the control unit stops the driving of the shift register by initializing the shift register and restarts the driving of the shift register by supplying a trigger signal to the shift register.

(10) The signal processing apparatus according to (9), in which the control unit supplies the trigger signal to an operation restarting position of the shift register in a case of restarting the driving of the shift register.

(11) The signal processing apparatus according to any one of (5) to (10), further including the shift register.

(12) The signal processing apparatus according to (11), further including:
the holding unit; and
the sense amplifier.

(13) A signal processing method including:
stopping driving of a shift register controlling transfer of pixel data of digital data obtained by A/D conversion in a part or the entirety of a period in which the A/D conversion is performed on a pixel output of an analog signal.

(14) An imaging element including:
a pixel array that includes a plurality of pixels each having a configuration for photoelectrically converting incident light;
an A/D conversion unit that performs A/D conversion on a pixel output of an analog signal obtained from the pixel array;
a holding unit that holds pixel data of digital data obtained by performing the A/D conversion on the pixel output by the A/D conversion unit;
a sense amplifier that converts the pixel data read out from the holding unit from a current to a voltage;
a shift register that controls transfer of the pixel data by controlling driving of the holding unit and the sense amplifier; and
a control unit that stops driving of the shift register in a part or the entirety of a period in which the A/D conversion is performed on the pixel output by the A/D conversion unit.

(15) The imaging element according to (14), in which the control unit stops the driving of the shift register from a start timing of the period in which the A/D conversion is performed on the pixel output by the A/D conversion unit.

(16) The imaging element according to (15), in which the control unit stops the driving of the shift register in a part or the entirety of a period in which A/D conversion is performed on a pixel output in a reset period of correlated double sampling by the A/D conversion unit and a period in which A/D conversion is performed on a pixel output in a signal readout period of the correlated double sampling by the A/D conversion unit.

(17) The imaging element according to any one of (14) to (16), in which the control unit counts a predetermined reference clock, and stops the driving of the shift register by stopping supply of a shift register clock for driving the shift register and restarts the driving of the shift register by restarting the supply of the shift register clock, on the basis of the count value.

(18) The imaging element according to any one of (14) to (17), in which the control unit stops the driving of the shift register by stopping supply of a shift register clock for driving the shift register and restarts the driving of the shift register by restarting the supply of the shift register clock, on the basis of an enable signal.

(19) The imaging element according to any one of (14) to (18), in which the control unit stops the driving of the shift register by initializing the shift register and restarts the driving of the shift register by supplying a trigger signal to the shift register.

(20) An electronic apparatus including:
an imaging unit that captures an image of a subject; and
an image processing unit that performs image processing on image data obtained by image capturing by the imaging unit,
in which the imaging unit includes:
a pixel array that includes a plurality of pixels each having a configuration for photoelectrically converting incident light;
an A/D conversion unit that performs A/D conversion on a pixel output of an analog signal obtained from the pixel array;
a holding unit that holds pixel data of digital data obtained by performing the A/D conversion on the pixel output by the A/D conversion unit;
a sense amplifier that converts the pixel data read out from the holding unit from a current to a voltage;
a shift register that controls transfer of the pixel data by controlling driving of the holding unit and the sense amplifier; and
a control unit that stops driving of the shift register in a part or the entirety of a period in which the A/D conversion is performed on the pixel output by the A/D conversion unit.

REFERENCE SIGNS LIST

100 Imaging element
101 Control unit
102 Pixel array unit
103 Row selection unit
104 Reference voltage generation unit
105 Column A/D conversion unit
106 Data transfer unit
107 Readout processing unit
108 Output interface unit
151 Data latch
152 and 153 Data bus
154 Sense amplifier
155 H scanner
161 Amplification unit
162 to 164 Flip-flop
165 to 167 Delay unit
181 H decoder
182 Shift register
191 Flip-flop
231 Control unit
232 Data processing unit
241 Count-type clock control unit
242 Trigger signal generation unit
243 SRAM
301 Enable-type clock control unit
600 Imaging device
612 CMOS image sensor
613 Image processing unit

The invention claimed is:

1. A signal processing apparatus, comprising:
an A/D conversion unit configured to perform, in a first period, A/D conversion on a first pixel output of an analog signal to obtain digital data; and
a processor configured to stop drive of a shift register that controls transfer of the digital data,
wherein the drive of the shift register is stopped in one of a part or an entirety of the first period in which the A/D conversion is performed on the first pixel output of the analog signal.

2. The signal processing apparatus according to claim 1, wherein the processor is further configured to stop the drive of the shift register from a start timing of the first period in which the A/D conversion is performed.

3. The signal processing apparatus according to claim 2, wherein
the processor is further configured to stop the drive of the shift register in one of a part or an entirety of a second period and one of a part or an entirety of a third period,
in the second period, the A/D conversion unit is further configured to perform the A/D conversion on a second pixel output,
the second pixel output is in a reset period of correlated double sampling,
in the third period, the A/D conversion unit is further configured to perform the A/D conversion on a third pixel output, and
the third pixel output is in a signal readout period of the correlated double sampling.

4. The signal processing apparatus according to claim 3, wherein the processor is further configured to:
stop the drive of the shift register in the entirety of the second period in which the A/D conversion is performed on the second pixel output in the reset period; and
stop the drive of the shift register in a fourth period longer than the second period in which the A/D conversion is performed on the second pixel output in the reset period,
wherein the fourth period is within the third period in which the A/D conversion is performed on the third pixel output in the signal readout period.

5. The signal processing apparatus according to claim 1, wherein
the shift register further:
controls drive of each of a holding unit and a sense amplifier, and
controls the transfer of the digital data based on the control of the drive of the holding unit and the sense amplifier,
the holding unit holds the digital data, and
the sense amplifier converts the digital data read out from the holding unit from a current to a voltage.

6. The signal processing apparatus according to claim 5, wherein the processor is further configured to:
stop supply of a shift register clock that drives the shift register;
stop the drive of the shift register based on the stop of the supply of the shift register clock;
restart the supply of the shift register clock; and
restart the drive of the shift register based on the restart of the supply of the shift register clock.

7. The signal processing apparatus according to claim 6, wherein the processor is further configured to:
count a specific reference clock; and
stop and restart the supply of the shift register clock based on a count value of the count of the specific reference clock.

8. The signal processing apparatus according to claim 6, wherein the processor is further configured to stop and restart the supply of the shift register clock based on an enable signal.

9. The signal processing apparatus according to claim 5, wherein the processor is further configured to:
stop the drive of the shift register by initialization of the shift register; and
restart the drive of the shift register by supply of a trigger signal to the shift register.

10. The signal processing apparatus according to claim 9, wherein the processor is further configured to supply the trigger signal to an operation restarting position of the shift register in a case of the restart of the drive of the shift register.

11. The signal processing apparatus according to claim 5, further comprising the shift register.

12. The signal processing apparatus according to claim 11, further comprising:
the holding unit; and
the sense amplifier.

13. A signal processing method, comprising:
performing, by an A/D conversion unit, in a specific period, A/D conversion on a pixel output of an analog signal to obtain digital data; and
stopping, by a processor, driving of a shift register controlling transfer of the digital data,
wherein the drive of the shift register is stopped in one of a part or an entirety of the specific period in which the A/D conversion is performed on the pixel output of the analog signal.

14. An imaging element, comprising:
a pixel array that includes a plurality of pixels,
wherein each pixel of the plurality of pixels is configured to photoelectrically convert incident light;
an A/D conversion unit configured to perform, in a first period, A/D conversion on a first pixel output of an analog signal obtained from the pixel array,
wherein the A/D conversion on the first pixel output is performed to obtain digital data;
a holding unit configured to hold the digital data obtained based on the A/D conversion on the first pixel output by the A/D conversion unit;
a sense amplifier configured to convert the digital data read out from the holding unit from a current to a voltage;
a shift register configured to:
control drive of each of the holding unit and the sense amplifier; and
control transfer of the digital data based on the control of the drive of the holding unit and the sense amplifier; and
a processor configured to stop drive of the shift register in one of a part or an entirety of the first period in which the A/D conversion is performed on the first pixel output by the A/D conversion unit.

15. The imaging element according to claim 14, wherein the processor is further configured to stop the drive of the shift register from a start timing of the first period in which the A/D conversion is performed on the first pixel output by the A/D conversion unit.

16. The imaging element according to claim 15, wherein the processor is further configured to stop the drive of the shift register in one of a part or an entirety of a second period and one of a part or an entirety of a third period, in the second period, the A/D conversion unit is further configured to perform the A/D conversion on a second pixel output,
the second pixel output is in a reset period of correlated double sampling,
in the third period, the A/D conversion unit is further configured to perform the A/D conversion on a third pixel output, and
the third pixel output is in a signal readout period of the correlated double sampling.

17. The imaging element according to claim 14, wherein the processor is further configured to:
count a specific reference clock;
stop, based on a count value of the count of the specific reference clock, supply of a shift register clock that drives the shift register;
stop the drive of the shift register based on the stop of the supply of the shift register clock;
restart, based on the count value, the supply of the shift register clock; and
restart the drive of the shift register based on the restart of the supply of the shift register clock.

18. The imaging element according to claim 14, wherein the processor is further configured to:
stop, based on an enable signal, supply of a shift register clock that drives the shift register;
stop the drive of the shift register based on the stop of the supply of the shift register clock;
restart the supply of the shift register clock based on the enable signal; and
restart the drive of the shift register based on the restart of the supply of the shift register clock.

19. The imaging element according to claim 14, wherein the processor is further configured to:
stop the drive of the shift register by initialization of the shift register; and
restart the drive of the shift register by supply of a trigger signal to the shift register.

20. An electronic apparatus, comprising:
an imaging unit configured to capture an image of a subject to obtain image data; and
an image processing unit configured to perform image processing on the image data,
wherein the imaging unit includes:
a pixel array that includes a plurality of pixels,
wherein each pixel of the plurality of pixels is configured to photoelectrically convert incident light;
an A/D conversion unit configured to perform, in a specific period, A/D conversion on a pixel output of an analog signal obtained from the pixel array,
wherein the A/D conversion on the pixel output is performed to obtain digital data;
a holding unit configured to hold the digital data obtained based on the A/D conversion on the pixel output by the A/D conversion unit;
a sense amplifier configured to convert the digital data read out from the holding unit from a current to a voltage;
a shift register configured to:
control drive of each of the holding unit and the sense amplifier; and
control transfer of the digital data based on the control of the drive of the holding unit and the sense amplifier; and a processor configured to stop drive of the shift register in one of a part or an entirety of the specific period in which the A/D conversion is performed on the pixel output by the A/D conversion unit.

* * * * *